United States Patent
Kawakami et al.

(10) Patent No.: US 10,811,937 B2
(45) Date of Patent: Oct. 20, 2020

(54) POWER TOOL

(71) Applicant: MAKITA CORPORATION, Anjo-shi (JP)

(72) Inventors: Takahiro Kawakami, Anjo (JP); Masatoshi Nakahama, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 276 days.

(21) Appl. No.: 15/919,712

(22) Filed: Mar. 13, 2018

(65) Prior Publication Data
US 2018/0205293 A1    Jul. 19, 2018

Related U.S. Application Data

(62) Division of application No. 14/631,317, filed on Feb. 25, 2015, now Pat. No. 9,954,418.

(30) Foreign Application Priority Data

Mar. 17, 2014  (JP) .................................. 2014053927
Mar. 17, 2014  (JP) .................................. 2014053928

(51) Int. Cl.
*B25F 5/02*     (2006.01)
*H02K 9/06*     (2006.01)
(Continued)

(52) U.S. Cl.
CPC ............ *H02K 9/06* (2013.01); *B24B 23/028* (2013.01); *B25F 5/008* (2013.01); *B25F 5/02* (2013.01);
(Continued)

(58) Field of Classification Search
CPC .... B25F 5/00; B25F 5/02; B25F 5/008; B24B 23/02; B24B 23/028; B24B 27/08;
(Continued)

(56) References Cited

U.S. PATENT DOCUMENTS 5,201,146 A     4/1993  Fushiya
6,120,362 A     9/2000  Etter et al.
(Continued)

FOREIGN PATENT DOCUMENTS

CN    1663749 A    9/2005
CN    1848591 A    10/2006
(Continued)

OTHER PUBLICATIONS

Office Action from the Japanese Patent Office dated Aug. 28, 2018 in related Japanese application No. 2017-193677, and machine translation thereof.
(Continued)

*Primary Examiner* — Scott A Smith
(74) *Attorney, Agent, or Firm* — J-TEK Law PLLC; Jeffrey D. Tekanic; Scott T. Wakeman

(57) ABSTRACT

A power tool includes a brushless motor having a stator and a rotor, which includes a rotary shaft extending in a front-rear direction of the power tool. The rotary shaft rotates a spindle that extends in an up-down direction of the power tool. A fan is fixedly coupled to the rotary shaft and rotates therewith. A switch is disposed rearward of the brushless motor and a controller is disposed rearward of the switch in the front-rear direction. A battery pack is disposed rearward of the controller. A main-body housing houses the brushless motor, the switch and the controller. The main-body housing includes a first tubular part, which houses the brushless motor, and a second tubular part, which houses the switch. The diameter of the second tubular part is smaller than the diameter of the first tubular part.

19 Claims, 15 Drawing Sheets

(51) Int. Cl.
*B24B 23/02* (2006.01)
*B25F 5/00* (2006.01)
*H02K 29/06* (2006.01)
*H02K 3/52* (2006.01)
*H02K 7/14* (2006.01)
*H02K 11/27* (2016.01)
*H02K 11/28* (2016.01)

(52) U.S. Cl.
CPC ............ *H02K 3/522* (2013.01); *H02K 7/145* (2013.01); *H02K 11/27* (2016.01); *H02K 29/06* (2013.01); *B24B 23/02* (2013.01); *H02K 11/28* (2016.01); *H02K 2203/09* (2013.01)

(58) Field of Classification Search
CPC ......... B24B 47/12; B25B 21/00; H02K 11/28; H02K 29/06
USPC ...... 173/29, 170, 213, 216, 217; 310/47, 50; 451/354, 357, 358, 359, 449, 454, 344
See application file for complete search history.

(56) References Cited

U.S. PATENT DOCUMENTS

| | | | |
|---|---|---|---|
| 6,320,286 | B1 | 11/2001 | Ramarathnam |
| 6,494,590 | B1 | 12/2002 | Paganini et al. |
| 6,632,128 | B2 | 10/2003 | Berger et al. |
| 8,398,465 | B2 | 3/2013 | Hoeschele et al. |
| 8,657,033 | B2 | 2/2014 | Sengiku et al. |
| 8,784,164 | B2 | 7/2014 | Dai |
| 8,816,544 | B2 | 8/2014 | Tanimoto et al. |
| 9,954,418 | B2 * | 4/2018 | Kawakami ............. H02K 29/06 |
| 2002/0100597 | A1 | 8/2002 | Numata |
| 2003/0190877 | A1 | 10/2003 | Gallagher et al. |
| 2004/0226969 | A1 | 11/2004 | Shew |
| 2005/0153636 | A1 | 7/2005 | Numata et al. |
| 2005/0196273 | A1 | 9/2005 | Nishikawa et al. |
| 2006/0214627 | A1 | 9/2006 | Ito et al. |
| 2008/0222871 | A1 | 9/2008 | Wilkinson et al. |
| 2009/0207035 | A1 | 8/2009 | Watanabe et al. |
| 2009/0280732 | A1 | 11/2009 | Esenwein |
| 2010/0009608 | A1 | 1/2010 | Lo et al. |
| 2010/0252293 | A1 | 10/2010 | Lopano et al. |
| 2010/0253162 | A1 | 10/2010 | Sakamaki et al. |
| 2011/0079408 | A1 | 4/2011 | Grunwald et al. |
| 2011/0171887 | A1 | 7/2011 | Tanimoto et al. |
| 2011/0180286 | A1 | 7/2011 | Oomori et al. |
| 2012/0037392 | A1 | 2/2012 | Ikuta et al. |
| 2013/0032010 | A1 | 2/2013 | Lopano et al. |
| 2013/0090045 | A1 | 4/2013 | Meyer |
| 2013/0126198 | A1 | 5/2013 | Campbell et al. |
| 2014/0139055 | A1 | 5/2014 | Oomori et al. |
| 2014/0174776 | A1 | 6/2014 | Grunwald et al. |
| 2014/0338947 | A1 | 11/2014 | Boeck et al. |
| 2015/0014013 | A1 | 1/2015 | Boeck et al. |
| 2015/0034348 | A1 | 2/2015 | Yoshida et al. |
| 2015/0263592 | A1 | 9/2015 | Kawakami et al. |

FOREIGN PATENT DOCUMENTS

| | | |
|---|---|---|
| CN | 101657297 A | 2/2010 |
| CN | 201711952 U | 1/2011 |
| CN | 102092040 A | 6/2011 |
| CN | 102149515 A | 8/2011 |
| CN | 203019328 U | 6/2013 |
| DE | 102011089719 A1 | 6/2013 |
| DE | 102011089722 A1 | 6/2013 |
| DE | 212013000108 U1 | 11/2014 |
| JP | S5524748 U | 2/1980 |
| JP | S5990124 U | 6/1984 |
| JP | 2000317904 A | 11/2000 |
| JP | 2001150366 A | 6/2001 |
| JP | 2002136780 A | 5/2002 |
| JP | 2002178276 A | 6/2002 |
| JP | 2002270066 A | 9/2002 |
| JP | 2004016272 A | 1/2004 |
| JP | 2007175833 A | 7/2007 |
| JP | 2012239380 A | 12/2012 |
| JP | 2012245614 A | 12/2012 |
| JP | 2013107171 A | 6/2013 |
| JP | 2013226617 A | 11/2013 |
| JP | 2013237105 A | 11/2013 |
| JP | 2014037037 A | 2/2014 |
| JP | 2014124728 A | 7/2014 |
| WO | 2009135338 A1 | 11/2009 |
| WO | 2010087235 A1 | 8/2010 |
| WO | 2013161444 A1 | 10/2013 |

OTHER PUBLICATIONS

Extended European Search Report from the European Patent Office dated Oct. 22, 2015 in related EP application No. 15 159 269.8, including European Search Opinion, European Search Report, and examined claims 1-5.
Office Action from the Chinese Patent Office dated Jul. 19, 2017 in related Chinese application No. 201510117065.9, including Search Report, and translation thereof.
Office Action from the Japanese Patent Office dated Jan. 26, 2016 in related Japanese application No. 2015-010526, and translation thereof.
Office Action from the Japanese Patent Office dated Jan. 30, 2018 in related Japanese application No. 2014-053927, and translation thereof.
Office Action from the Japanese Patent Office dated Sep. 8, 2015 in related Japanese application No. 2015-010526, and translation thereof.
Office Action from the Japanese Patent Office dated Jun. 27, 2017 in related Japanese application No. 2014-053928, and translation thereof.
Product brochure for Hitachi Cordless Angle Drill Model Nos. DN 14DSL and DN 18DSL having document generation date of Sep. 29, 2014.
Product brochure for Hitachi Cordless Multi Tool Model Nos. CV 14DBL and CV 18DBL having document generation date of Jan. 29, 2015.
Search Report by Registered Searching Organization dated Jan. 25, 2018 and prepared on behalf of Japanese Patent Office for counterpart (priority) Japanese application No. 2014-053927, including machine translation thereof and machine translation of examined claims 1-6.
Translation of Specification, Claims, Abstract and Drawings of WO 2013/161444.
Web page printout showing Hitachi Cordless Angle Drill Model No. DN 14DSL printed on Mar. 11, 2015.
Web page printout showing Hitachi Cordless Angle Drill Model No. DN 18DSL printed on Mar. 11, 2015.
Office Action from the Chinese Patent Office dated Oct. 8, 2018 in related Chinese application No. 201510117065.9, and translation thereof.
Search Report from the Chinese Patent Office dated Sep. 21, 2018 in related Chinese application No. 201510117065.9.

* cited by examiner

POWER TOOL

CROSS-REFERENCE

The present application is a divisional application of U.S. patent application Ser. No. 14/631,317 filed Feb. 25, 2015, now U.S. Pat. No. 9,954,418, which claims priority to Japanese patent application serial numbers 2014-053927 and 2014-053928, both filed on Mar. 17, 2014, the contents of which are incorporated fully herein by reference.

TECHNICAL FIELD

The present invention generally relates to power tools, such as a rechargeable grinder, that use a battery (battery pack) as a power supply.

BACKGROUND ART

Power tools that use a battery as a power supply typically comprise a controller having a control (circuit) board equipped with a microcontroller, etc. for controlling the drive (output) of a motor, as disclosed e.g., in Japanese Laid-open Patent Publication 2013-226617. The controller is housed in a battery-mount part formed at an end part of the tool housing and is cooled by outside air (motor cooling air) drawn (sucked) in through air-suction ports provided in side surfaces of the battery-mount part.

SUMMARY

In power tools that have a generally linear tool housing, a portion of the tool housing is designed to be grasped by the user during use. Such a grip portion typically has a substantially uniform cross-section in the longitudinal/axial direction of the tool housing, which can make the power tool difficult and/or uncomfortable to hold, especially for users having smaller hands.

In addition or in the alternative, the battery-mount part is typically provided with a terminal block for mounting (physically and electrically connecting to) the battery pack. The temperature of the terminal block rises together with that of the battery (battery pack). However, the above-mentioned power tool only cools the controller using the motor cooling air, and the terminal block is not cooled thereby.

In addition or in the alternative, the controller (circuit board) of such power tools is typically mounted in or near the battery-mount part. Thus, the temperature of the power tool controller (circuit board) also may rise together with that of the battery (battery pack). However, known power tools do not effectively cool the controller (circuit circuit).

An object of the present teachings is to overcome one or more problems of the prior art.

In a first aspect of the present teachings, a power tool having a more ergonomically designed grip portion is disclosed. Such a power tool may preferably include a brushless motor comprising a stator and a rotor, the rotor comprising a rotary shaft extending in a front-rear direction of the power tool. A spindle is rotatable by the rotary shaft and extends in an up-down direction of the power tool that is at least substantially perpendicular to the front-rear direction. A fan is fixedly coupled to the rotary shaft so as to rotate therewith. A switch is disposed rearward of the brushless motor in the front-rear direction. A controller is disposed rearward of the switch in the front-rear direction and controls the operation of the brushless motor. A battery pack is disposed rearward of the controller in the front-rear direction. A main-body housing houses the brushless motor, the switch and the controller. The main-body housing comprises a first tubular part, which houses the brushless motor, and a second tubular part, which houses the switch. The second tubular part has a diameter that is smaller than the diameter of the first tubular part.

Such an embodiment makes it possible for users to hold the main-body housing more comfortably, e.g., because users with smaller hands can grip the second (smaller) tubular part.

In a second aspect of the present teachings, a power tool is disclosed that can suitably cool, in addition to a controller, a terminal block for mounting a battery (battery pack). Such a power tool preferably comprises a motor and a controller that controls the drive (output) of the motor, both of which are housed (accommodated) inside a (tool) housing. A battery (battery pack) is mounted (mountable) on the housing and serves as a power supply for the power tool. A fan is provided on a rotary shaft of the motor and sucks in outside air, by the rotation of the motor (i.e. when the motor shaft rotates), through one or more air-suction ports provided (defined) in the housing, the outside air being caused to pass or flow through the motor. The controller is disposed adjacent to a terminal block provided on a battery-mount part of the housing, the terminal block being electrically connected (connectable) to the battery. The air-suction port(s) is (are) provided between the controller and the terminal block.

Such an embodiment makes it possible to suitably cool the terminal block in addition to the controller.

In such an embodiment, the motor, the controller, and the terminal block are preferably disposed along a straight line (e.g., an imaginary straight line passes through or intersects the motor, controller and terminal block). The controller is preferably tilted with respect to the straight line.

In addition or in the alternative, a display part (display) for displaying the remaining battery capacity of the battery (battery pack) is preferably provided at an end part of the tilted controller on the side thereof nearest the terminal block. The display part is preferably visible to the user via (through) a window (transparent material) provided on the battery-mount part.

Such an embodiment provides an easily visible display part (display) because the display part (display) for the remaining battery capacity is provided on the tilted controller.

In addition or in the alternative, the battery is (also) tilted (inclined) with respect to the straight line.

In addition or in the alternative, one or more guide walls preferably guide(s) the outside air drawn (sucked) in through the air-suction port(s) to (towards) a center (center portion) of the controller and is (are) provided on an inner surface of the (tool) housing between the controller and the air-suction port(s).

Such a guide wall or guide walls make(s) it possible to more effectively cool the controller.

In such an embodiment, a plurality of ribs may be provided to rectify (straighten or make unidirectional) the outside air drawn (sucked) in through the air-suction port(s) and the ribs are preferably provided on the guide wall(s).

In addition or in the alternative, the controller preferably comprises a circuit board housed in a case and a lattice of grooves is preferably formed in a surface of the case on the air-suction-port side.

In addition or in the alternative, the air-suction port(s) is (are) preferably covered by one or more covers, e.g., that have a filter material to allow outside air to pass through, but block the ingress of foreign matter, such as particulate matter.

In a third aspect of the present teachings, a power tool is disclosed that can more suitably cool the power tool controller (circuit board). Such a power tool preferably includes a brushless motor comprising a stator and a rotor, the rotor comprising a rotary shaft extending in a front-rear direction of the power tool. A spindle is rotated by the rotary shaft and extends in an up-down direction of the power tool that is at least substantially perpendicular to the front-rear direction. A fan is fixedly coupled to the rotary shaft so as to rotate therewith. A switch is disposed rearward of the brushless motor in the front-rear direction. A controller is disposed rearward of the switch in the front-rear direction and controls the operation of the brushless motor. A battery pack is disposed rearward of the controller in the front-rear direction. A main-body housing houses the brushless motor, the switch, and the controller. A battery-mount part is defined at a rear end of the main-body housing in the front-rear direction, and the battery pack is detachably attachable to the battery-mount part. The battery-mount part of the main-body housing also houses the controller, at least one air-suction port is provided in the battery-mount part and the controller is disposed in the battery-mount part such that air, which is sucked in through the at least air-suction port as the fan rotates, is directed towards the controller and cools the controller.

Additional objects, features, embodiments and advantages of the present teachings will become apparent upon reading the following detailed description in view of the appended claims and attached drawings.

DETAILED DESCRIPTION

Figure 1:
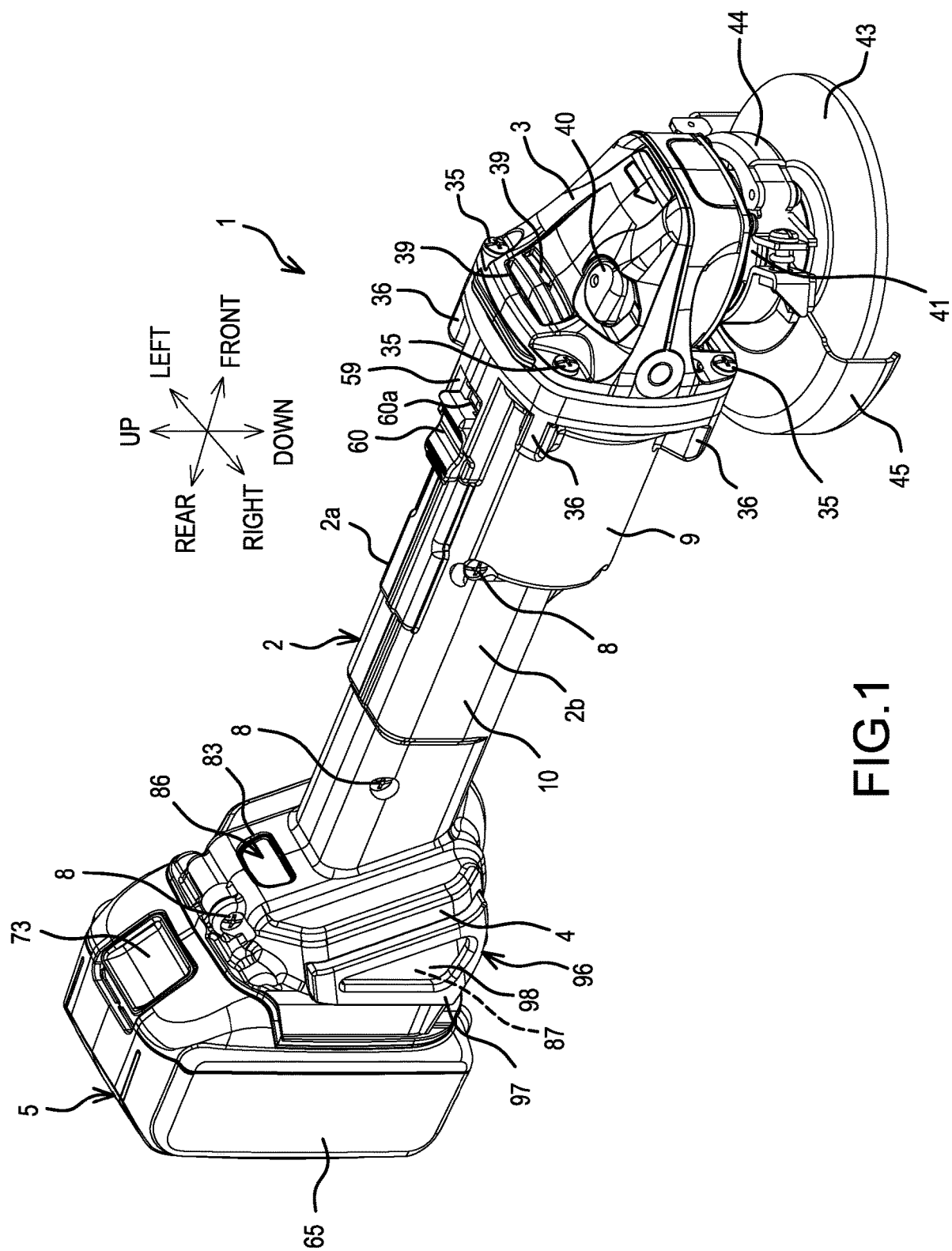
FIG. 1 is an oblique view of a rechargeable grinder according to one representative, non-limiting embodiment of the present teachings.

Representative, non-limiting embodiments of the present invention will be explained below with reference to the drawings.

In FIGS. 1-11, a first embodiment in the form of a rechargeable grinder (e.g., an angle grinder) is shown. The rechargeable grinder (hereinbelow, simply called "grinder") 1 includes a gear housing 3 from which a spindle 7 protrudes and faces downward. The gear housing 3 is coupled to the front of a tubular main-body housing 2 that houses a brushless motor 6 in its front part. A battery pack (battery) 5 that serves as a power supply is (e.g., detachably) mounted onto a battery-mount part 4 formed at a rear end of the main-body housing 2. The main-body housing 2 is formed by joining left and right half housings 2a, 2b using screws 8. The part of the main-body housing 2 that surrounds the brushless motor 6 is a generally circular-tubular part 9, which is the thickest (widest) part of the main-body housing 2. A generally square-tubular part 10 is disposed rearward thereof and is thinner (narrower) than the circular-tubular part 9. The square-tubular part 10 houses a switch 46, which is described below. The square-tubular part 10 is used as a grip and has a sufficient length so that four fingers of an operator can be placed therearound to grasp or hold the grinder 1 during use. That is, an easy-to-grasp small-diameter grip 10 is formed rearward of the brushless motor 6.

It is noted that the diameter of the generally square-tubular part 10 may be approximated by measuring, in a cross-section perpendicular to the extension of the main-body housing, the distance between the center of the generally square-tubular part 10 and a corner of the generally square-tubular part 10. In this respect, the diameter of the generally square-tubular part 10 is smaller than the diameter of the generally circular-tubular part 9. In the alternative, it is understood that the circumference or (non-circular) outer periphery, as measured in the cross-section perpendicular to the extension of the main-body housing, of the generally square-tubular part 10 is less than the circumference of the generally circular-tubular part 9.

The brushless motor 6 is an inner-rotor-type motor that comprises a stator 11 and, on the inner side thereof, a rotor 12. Furthermore, the stator 11 comprises a tubular stator core 13, which is formed of a plurality of laminated steel sheets. A front insulator 14 and a rear insulator 15 are respectively provided on the front and rear end surfaces of the stator core 13 in the axial direction. Six coils 16 are respectively wound on the stator core 13 and through the front and rear insulators 14, 15. Furthermore, a sensor circuit board 17 and a short-circuiting member 18 are attached to the rear insulator 15.

Figure 4:
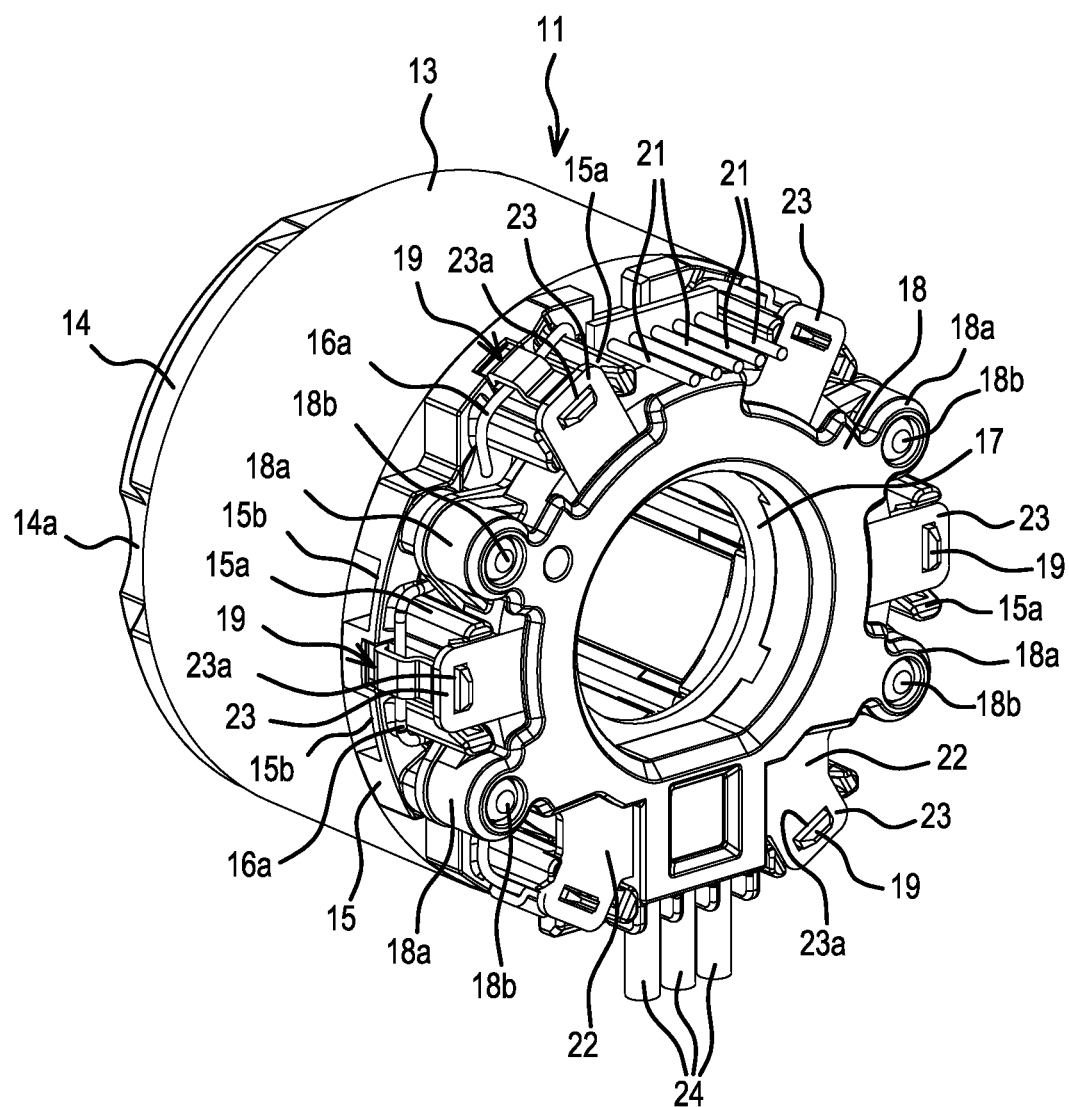
FIG. 4 is an oblique view of a stator, viewed from the rear.

The rear insulator 15 is a ring-shaped (annular), integrally-molded article having a diameter the same as that of the stator core 13. As shown in FIG. 4, six fusing terminals 19 are respectively held by six retaining parts 15a, which project concentrically and are spaced equidistantly on a rear surface of the rear insulator 15. The coils 16 are formed by sequentially winding a single winding wire around each of the six teeth of the stator core 13 without cutting or interrupting the single winding wire. The coils 16 are electrically connected to the respective fusing terminals 19 by respective winding wires 16a that connect (extend between) adjacent coils 16, 16 and are sandwiched in (interleaved through and then crimped in) the respective fusing terminals 19. A pair of recessed, positioning parts 15b, 15b is formed in each of the left and right side surfaces of the rear insulator 15.

The sensor circuit board 17 is equipped with three rotation-detection devices (not shown) that detect the positions of permanent magnets 20 provided on the rotor 12 and output rotation-detection signals. The sensor circuit board 17 is doughnut shaped (annular) and has an outer diameter that fits inside the retaining parts 15a. Signal lines 21 of the rotation-detection devices are led out (extend) from an upper part of the sensor circuit board 17.

The short-circuiting member 18 is ring shaped (annular), is made of resin, and has a diameter that is substantially the same as that of the sensor circuit board 17. Four bosses 18a mate with the screw bosses (not shown) provided on the rear insulator 15 from the front, and are integrally provided such that they project at (from) the outer circumference of the short-circuiting member 18. In addition, three arcuate sheet-metal members 22, each of which comprises a pair of short-circuiting pieces 23 that project along a straight (diagonal) line, are insert-molded in the resin of the short-circuiting member 18 such that they are not in contact with one another but they partially overlap concentrically. The short-circuiting pieces 23 protrude radially from the short-circuiting member 18 in correspondence to the fusing terminals 19. Six slits 23a are respectively formed at the tips of the short-circuiting pieces 23 and are configured to have the fusing terminals 19 inserted therein. U-phase, V-phase, and W-phase power-supply lines 24 are respectively electrically connected (e.g., welded or soldered) to the sheet-metal members 22 and are led out (extend) from a lower part of the short-circuiting member 18.

When the short-circuiting member 18 is disposed so as to overlap the sensor circuit board 17 from the rear such that the screw bosses of the rear insulator 15 are inserted into the bosses 18a and the short-circuiting member 18 is affixed thereto by screws 18b, the tips of the fusing terminals 19 are respectively inserted into their corresponding short-circuiting pieces 23. If the fusing terminals 19 and the short-circuiting pieces 23 are soldered in this state, then the diametrically-opposite fusing terminals 19 (i.e. each pair of fusing terminals 19 that are located in point symmetry with respect to each other) are short-circuited (electrically connected) by the respective sheet-metal members 22. That is, the fusing terminals 19, which are electrically connected to the winding wires 16a between adjacent coils 16, 16 that are sequentially wound around the stator core 13, are electrically connected in diagonal pairs by the three sheet-metal members 22, thereby forming a so-called parallel-winding delta connection.

In the present embodiment, because the sensor circuit board 17 and the short-circuiting member 18 fit within the height (axial) dimension of the fusing terminals 19, the overall (axial) length of the brushless motor 6 can be kept to a minimum even though the short-circuiting member 18, etc. is (are) used. Furthermore, except for the signal lines 21, the power-supply lines 24, and the like, all the elements fit within the outer diameter of the stator core 13. Consequently, the outer diameter of the product (grinder 1) also does not increase, and the product is therefore compact in the transverse direction. In addition, because the signal lines 21 are led out (extend) from above and the power-supply lines 24 are led out (extend) from below, wiring is easy/uncomplicated. However, in a modified embodiment, the signal lines 21 may be attached upside-down such that they are led out (extend) from below, and may be led out (extend) from above or below together with the power-supply lines 24.

The stator 11 thus assembled is held at a position coaxial with the circular-tubular part 9 by support ribs 25, 25 that project in the circumferential direction on the respective inner surfaces of the half housings 2a, 2b of the main-body housing 2. A latching rib 25a that latches with a notch 14a provided on the front insulator 14 is provided forward of the support ribs 25. Projections 25b, 25b (FIG. 12) that mate with the recessed, positioning parts 15b, 15b provided in the rear insulator 15 are provided rearward of the support ribs 25, and thereby perform the forward-rearward positioning.

In one or more alternative embodiments, the short-circuiting member 18 and the sensor-circuit board 17 may be formed integrally, and/or the coils 16 may be made or connected (wired) in a so-called Y connection.

The rotor 12 comprises a rotary shaft 26 located along the axial center of the rotor 12. A substantially circular-cylindrical rotor core 27 is disposed around the rotary shaft 26 and is formed by stacking a plurality of steel plates (laminations). Four sheet-shaped (plate-shaped) permanent magnets (sintered magnets) 20 are fixed to an inner part of the rotor core 27. The permanent magnets 20 are respectively fixed, by adhesive and/or press fitting, inside through holes formed such that they are located, in a transverse cross section, at the four sides of a square centered on the rotary shaft 26 of the rotor core 27.

The rotary shaft 26 is rotatably supported by a bearing 29 held by a partition plate 28 interposed between the main-body housing 2 and the gear housing 3. The tip of the rotary shaft 26 protrudes into the gear housing 3. A centrifugal fan 30 is attached to the rotary shaft 26 rearward of the partition plate 28. A bowl shape, which narrows toward the rear, is formed in a front-end inner surface of the main-body housing 2, wherein the centrifugal fan 30 is housed. This bowl shape causes an airflow that is generated in radial directions from the centrifugal fan 30 to be guided forward. A through hole (not shown) is provided in the partition plate 28, which enables (directs) the airflow from the centrifugal fan 30 to be delivered into the gear housing 3.

The rear end of the rotary shaft 26 is rotatably supported by a bearing 32 held by receiving plates 31 that are provided at the rear end of the circular-tubular part 9 such that they protrude from the left and right half housings 2a, 2b.

Furthermore, a front stopper 33 is provided in the rotor 12 between the rotor core 27 and the centrifugal fan 30. The front stopper 33 is a brass disc, whose outer diameter is the same as that of the rotor core 27, and is fastened to the rotary shaft 26 coaxially with the rotor core 27. Moreover, a rear stopper 34 is provided on the rear side between the rotor core 27 and the bearing 32. The rear stopper 34 is a brass disc, whose outer diameter is smaller than that of the rotor core 27, and is fastened to the rotary shaft 26 coaxially with the rotor core 27. However, the outer diameter of the rear stopper 34 is larger than an imaginary circle surrounded (defined) by the (radially) inner sides of the four permanent magnets 20, and the rear stopper 34 is located rearward of the permanent magnets 20.

The gear housing 3 is fixed by screwing four screws 35, which are inserted from the front at the four corners, through the partition plate 28 and into screw-locking parts 36 provided at a front end outer circumference of the main-body housing 2. A bevel gear 37 is fastened to a front end of the rotary shaft 26, which protrudes into the gear housing 3. The bevel gear 37 meshes with a bevel gear 38 fastened to an upper end of the spindle 7. Air-exhaust ports 39 are formed in a front surface of the gear housing 3, and a shaft lock 40 is capable of locking, by a push-in operation, the rotation of the spindle 7 to the bevel gear 38. The spindle 7 is rotatably supported by upper and lower bearings 42, 42 held by the gear housing 3. A bearing box 41 is assembled (joined) to the lower part of the gear housing 3, and protrudes downward. A tool accessory 43, such as a discoidal (disk-shaped) grinding wheel, can be mounted onto a lower end of the spindle 7. A wheel cover 45 covers a rear half part of the tool accessory 43 and is mounted, by a belt-shaped clamp (band clamp) 44, on an outer circumference of the bearing box 41.

Figure 5:
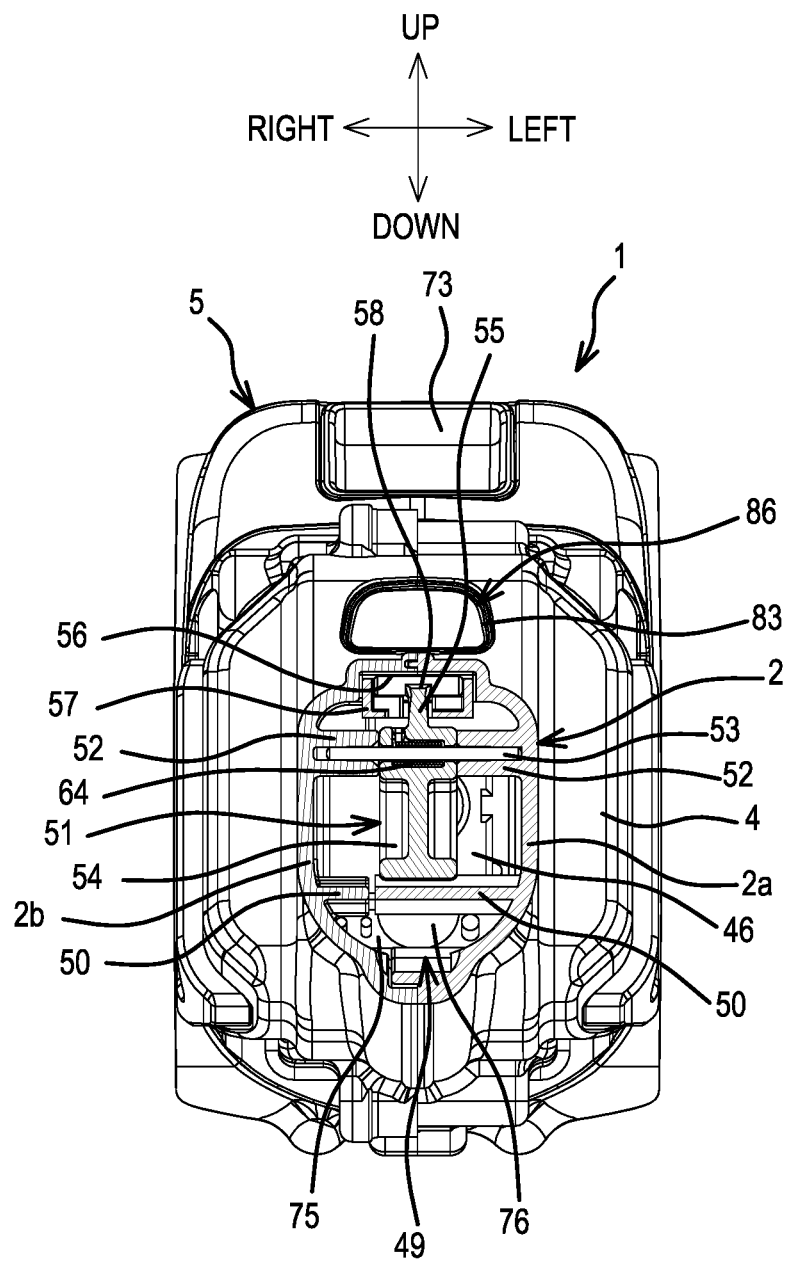
FIG. 5 is a cross-sectional view taken along line B-B in FIG. 2.

A switch 46 is provided inside the main-body housing 2, and is turned ON by pushing a button 47. The switch 46 is held by retaining ribs 48 that protrude from the inner surfaces of the half housings 2a, 2b at an orientation such that a terminal (contact) end of the button 47 faces forward within the square-tubular part 10. A space 49 for passing the power-supply lines 24, the signal lines 21, and the like therethrough, is thereby formed downward of the switch 46. In addition, partition walls 50, which partition the brushless motor 6 from the switch 46, project from the half housings 2a, 2b forward of the retaining ribs 48. A changing lever (switch lever) 51 serves as a lever member (lever) that forms (is a part of) a pressing mechanism, and is provided between the partition walls 50 and the switch 46. As shown in FIG. 5, a pin 53 is supported at both ends by support bosses 52, which are provided such that they protrude from the inner surfaces of the half housings 2a, 2b. The pin 53 is inserted through the changing lever 51, which is thereby rotatably supported. A cam part 54 is disposed on a lower side of the pin 53, is located forward of the button 47 of the switch 46 and bulges rearward. An arm part 55 protrudes such that it faces upward and is disposed on an upper side of the pin 53. A slide plate 57 serves as a slide member that is capable of sliding forward and rearward along the longitudinal direction of an inner-guide groove 56, which is recessed in the inner surface of the main-body housing 2 and extends in the front-rear direction. The slide plate 57 is provided inside the main-body housing 2 upward of the changing lever 51. The arm part 55 of the changing lever 51 is inserted into a coupling hole 58 provided in (at) a rear end of the slide plate 57.

Referring to FIG. 1, a longitudinally-extending outer-guide groove 59 is formed in an upper-part outer surface of the main-body housing 2. A switch knob 60 that serves as an operating member is housed (disposed) inside (within) the outer-guide groove 59 and is longitudinally moveable. An L-shaped latching piece 61 (see FIG. 2) projects downward from a lower surface of the switch knob 60, passes through a longitudinally-extending slit 62 formed in the main-body housing 2, protrudes into the main-body housing 2, and engages in a latching hole 63 provided in a front end of the slide plate 57.

Figure 2:
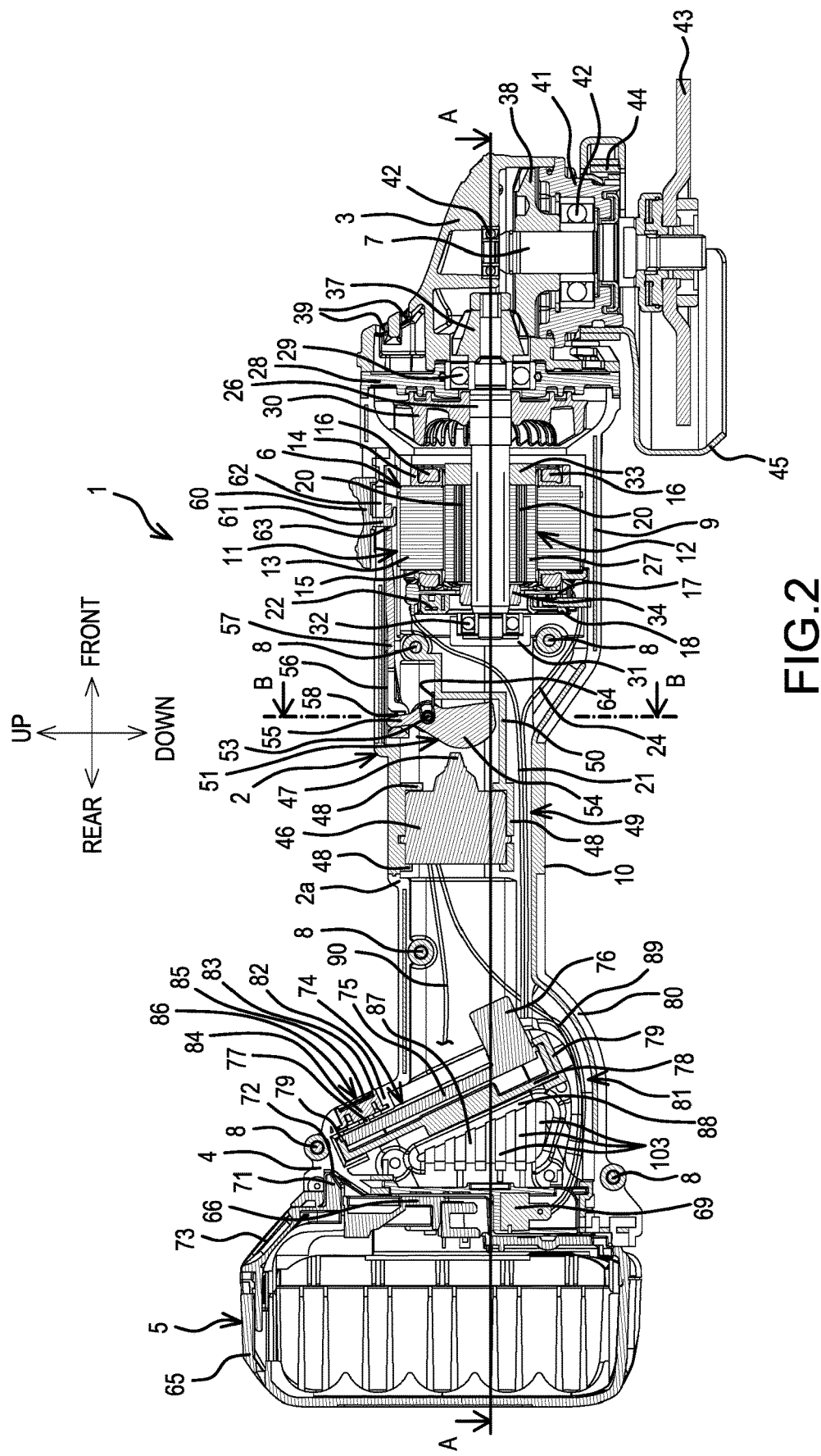
FIG. 2 is a longitudinal-cross-sectional view of the rechargeable grinder (in the switch OFF state).
Figure 3:
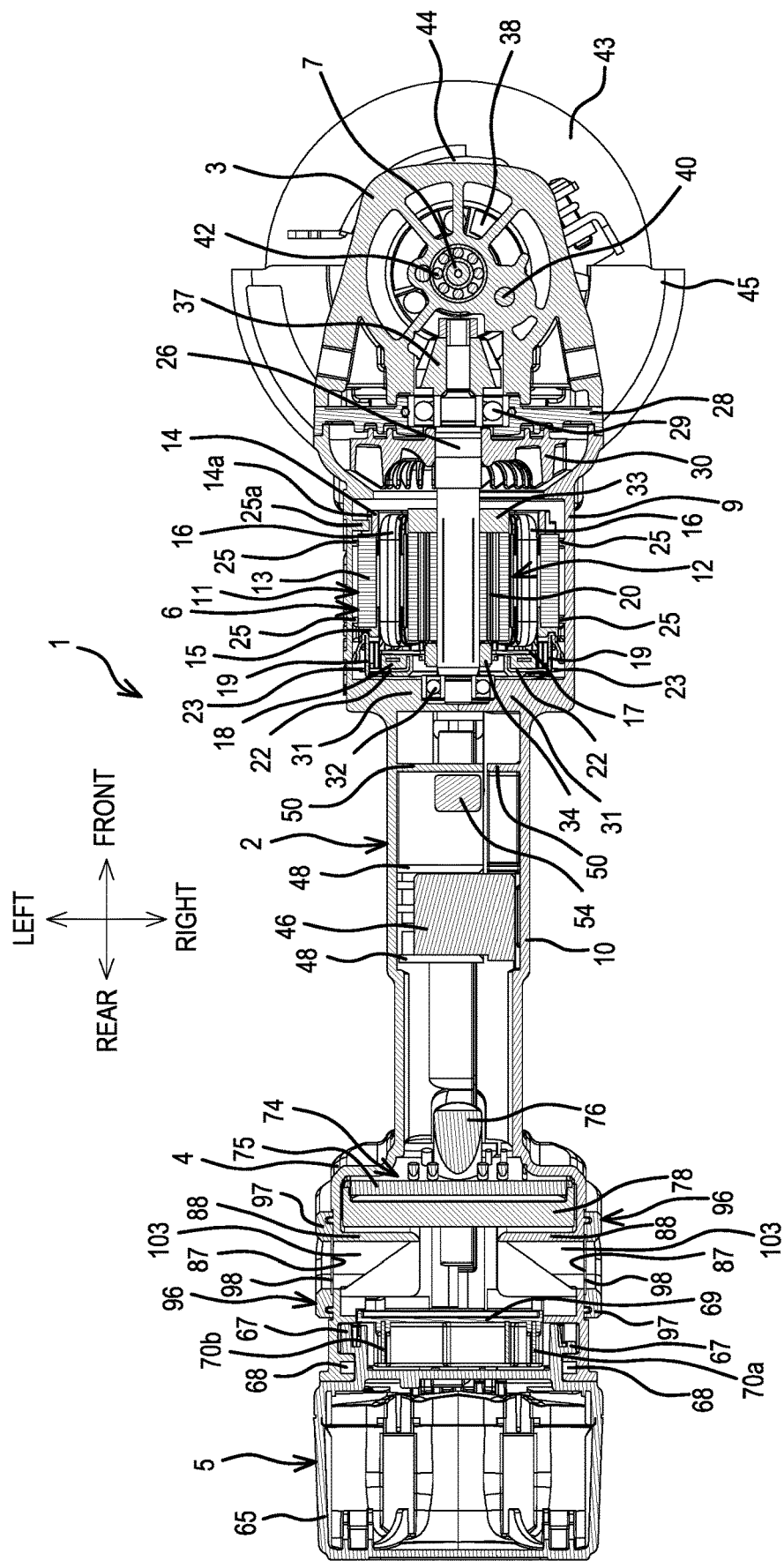
FIG. 3 is a cross-sectional view taken along line A-A in FIG. 2.
Figure 6:
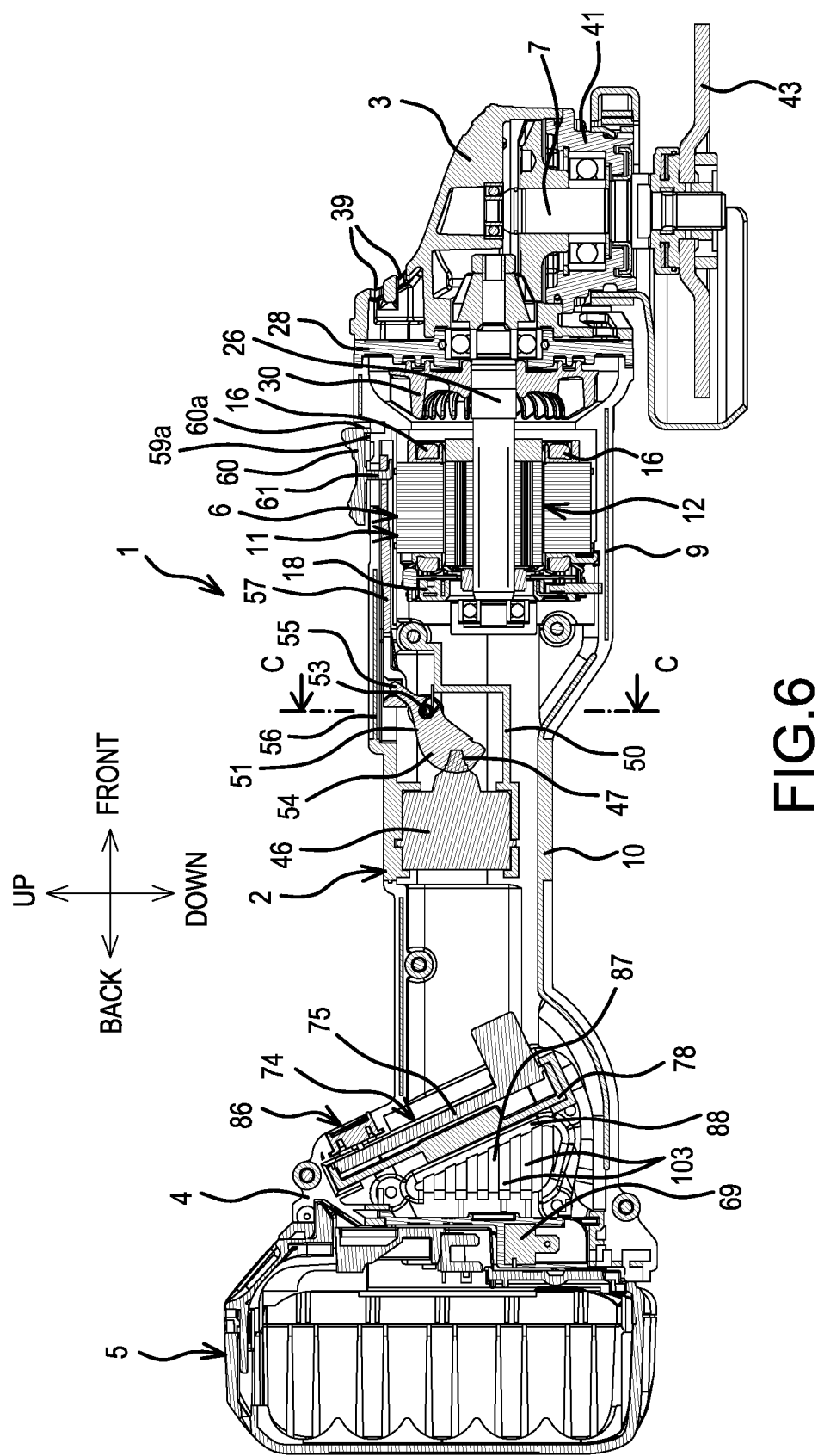
FIG. 6 is a longitudinal-cross-sectional view of the rechargeable grinder (in the switch ON state).
Figure 7:
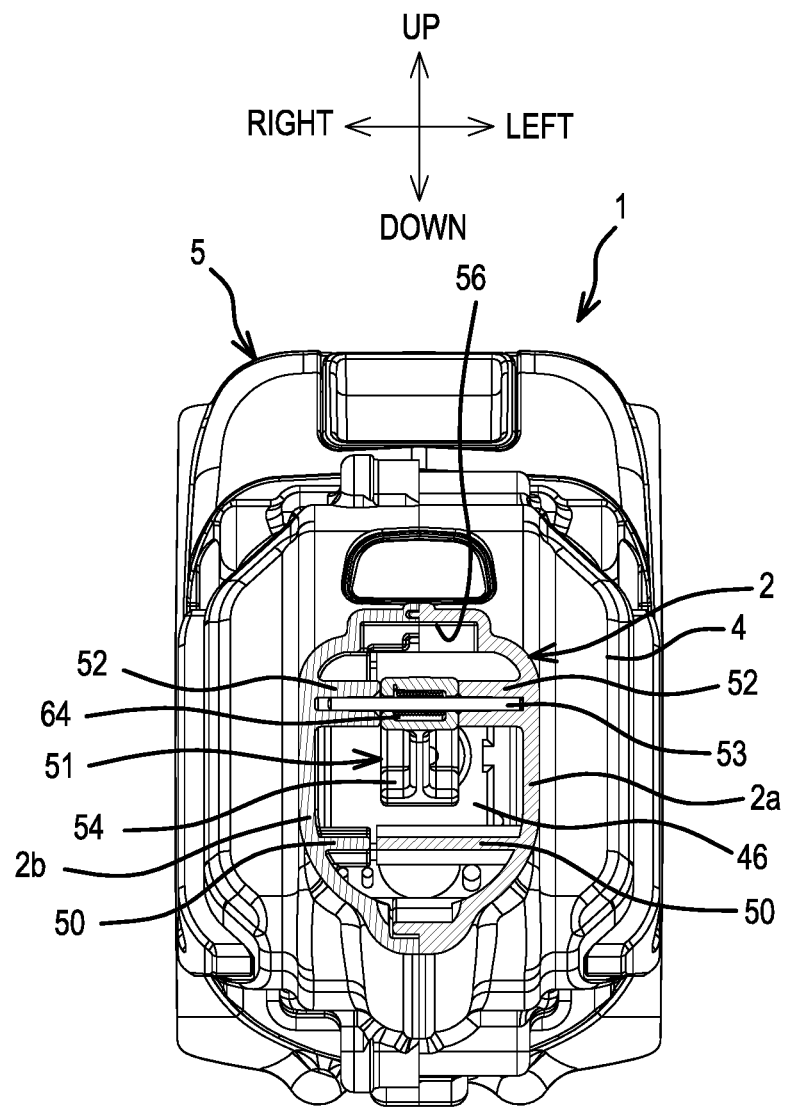
FIG. 7 is a cross-sectional view taken along line C-C in FIG. 6.

As a result, if the switch knob 60 is slid forward within the outer-guide groove 59, then the slide plate 57 also slides forward, because it is linked therewith, and the arm part 55 on the rear end is moved forward. Consequently, the changing lever 51 rotates clockwise around the pin 53 as shown in FIG. 2. Furthermore, as shown in FIGS. 6 and 7, the cam part 54 thereby slides rearward and pushes the button 47. The ON state is maintained by virtue of a protruding piece 60a, which projects downward from a front end of the switch knob 60, latching with a protruding part 59a that projects from a front side of a bottom part of the outer-guide groove 59.

Conversely, if the switch knob 60 is slid rearward, then the slide plate 57 slides rearward and the changing lever 51 is rotated counterclockwise via the arm part 55, thereby causing the cam part 54 to separate away from the button 47. It is noted that the pin 53 is encased (surrounded) by a torsion spring 64 that is hooked onto the changing lever 51 and the partition walls 50. Therefore, the torsion spring 64 urges the changing lever 51 toward the counterclockwise direction (toward the switch OFF side/position).

The battery pack 5 has a coupling part 66 that comprises terminals (not shown) at an upper part of an outer case 65, which contains a plurality of battery cells, e.g., lithium ion battery cells. A pair of rail parts 67, 67 respectively project from the two sides of the coupling part 66. The battery-mount part 4 has an opening into which the coupling part 66 of the battery pack 5 is inserted. A pair of left and right guide rails 68, 68 respectively mate with the rail parts 67, 67 of the coupling part 66 and respectively project from the two sides of the opening. In addition, a terminal block 69 comprising terminal plates (electrical contacts) 70a, 70b corresponding to the terminals of the coupling part 66 is provided so as to face upward between the guide rails 68, 68. The terminal plates (electrical contacts) are held spaced apart by an electrically-insulating material. As a result, if the battery pack 5 is slid such that the rail parts 67, 67 mate (slidably engage) with the guide rails 68, 68 at a vertically oriented orientation wherein the coupling part 66 is set forward, then the terminals of the coupling part 66 and the terminal plates 70a, 70b of the terminal block 69 are electrically connected. A latching tab 71 is provided on the battery pack 5 and, in the mounted state, engages with a recessed part 72 provided in the battery-mount part 4, thereby locking the battery pack 5 in place. Operation (depressing) of a release button 73 causes the latching tab 71 to retract into the outer case 65, thereby making it possible to detach the battery pack 5.

Furthermore, in the battery-mount part 4, a controller 74 is housed (disposed) forward of the terminal block 69. The controller 74 houses (includes), e.g., six fETs (not shown) corresponding to the coils 16 of the brushless motor 6, a capacitor 76, a microcontroller (not shown), e.g., including a microprocessor and memory, a circuit board 75 equipped with LEDs 77, etc., and a dish-shaped case 78, e.g., made of aluminum. The controller 74 is held by retaining parts 79, 79 provided above and below on the inner surfaces of the half housings 2a, 2b. In the present embodiment, the retaining part 79 on the lower side is located forward of the retaining part 79 on the upper side, and a lower end of the controller 74 is located forward of the upper end with respect to an axis line (longitudinal or axial direction) of the main-body housing 2 and is supported in a tilted (inclined) orientation. Even though the capacitor 76 is provided at an end part of the circuit board 75, the capacitor 76 can still be located in the center within the main-body housing 2 because it is tilted. Therefore, the main-body housing 2 is not required to have a protruding (bulging) shape in order to accommodate (house) the capacitor 76. In addition, the spacing between the aluminum case 78 and the terminal block 69 can be made wider because the controller 74 is tilted. Therefore, there is little risk that the aluminum case 78 and the terminal block 69 will come into electrical conductivity (i.e. the risk of a short circuit is reduced). Furthermore, if desired, the capacitor 76 may be spaced farther apart from the circuit board 75 by lengthening the electrode terminals of the capacitor 76.

The lower part of the battery-mount part 4 includes a bulged part 80 that bulges downward from the square-tubular part 10. A (hollow) space 81 that provides communication between the front and rear of the controller 74 is thereby formed between the controller 74 and the bulge part 80.

Two or more LEDs 77 are preferably installed on an upper end side of the circuit board 75 so as to face (be visible through) a window 83 provided in a tilted part 82 that is formed on an upper side of the battery-mount part 4 such that the tilted part 82 extends in substantially the same direction as (i.e. at least substantially in parallel to) the controller 74. A shield plate 84 that partitions the LEDs 77 and a display panel 85 that covers a front surface of the shield plate 84 are provided inside (under) the window 83, thereby forming an externally visible, remaining-battery-capacity display part 86. In this embodiment, because the display part 86 extends in the upward, downward, frontward, and rearward directions, the visibility of the display part 86 to the user is improved (see e.g., FIG. 2).

Referring now to FIGS. 2 and 6-9, air-suction ports 87 are respectively formed on (in) the left and right side surfaces of the battery-mount part 4 between the terminal block 69 and the controller 74. Each air-suction port 87 is formed in a triangular shape that matches the shape of the space formed between the terminal block 69 and the tilted controller 74 and whose length in the forward direction increases toward the downward side.

Figure 8:
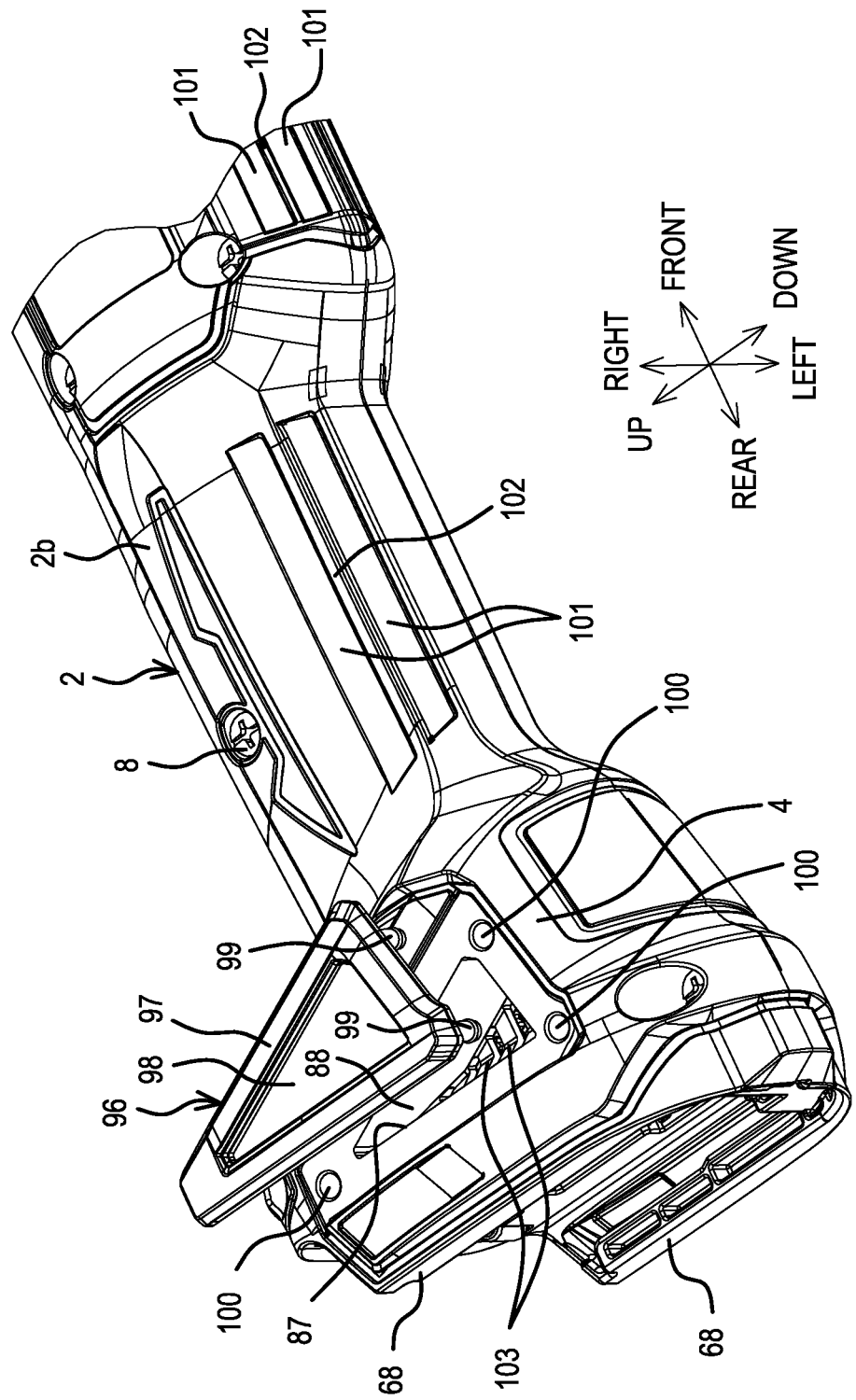
FIG. 8 is an oblique view of a rear-half part (the terminal block is not shown) and an air-suction-port cover of a main-body housing.
Figure 9:
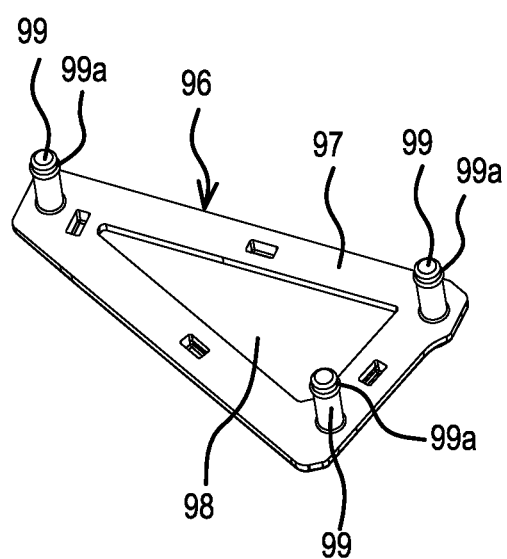
FIG. 9 is an oblique view of the air-suction-port cover, viewed from a rear surface.
Figure 10:
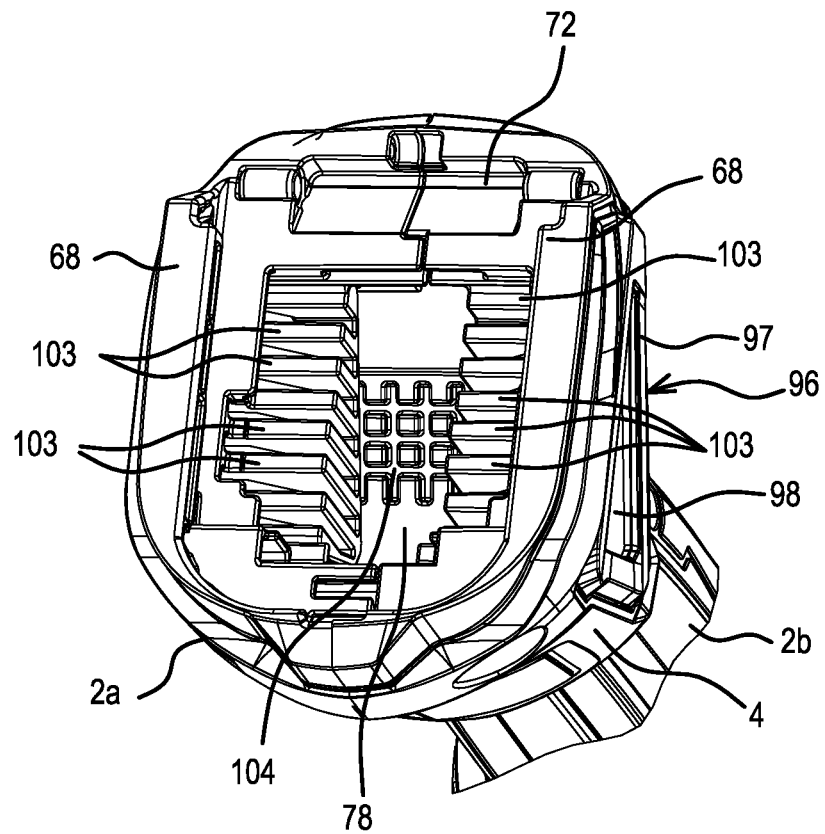
FIG. 10 is an oblique view of a battery-mount part (the terminal block is not shown), viewed from the rear.
Figure 11:
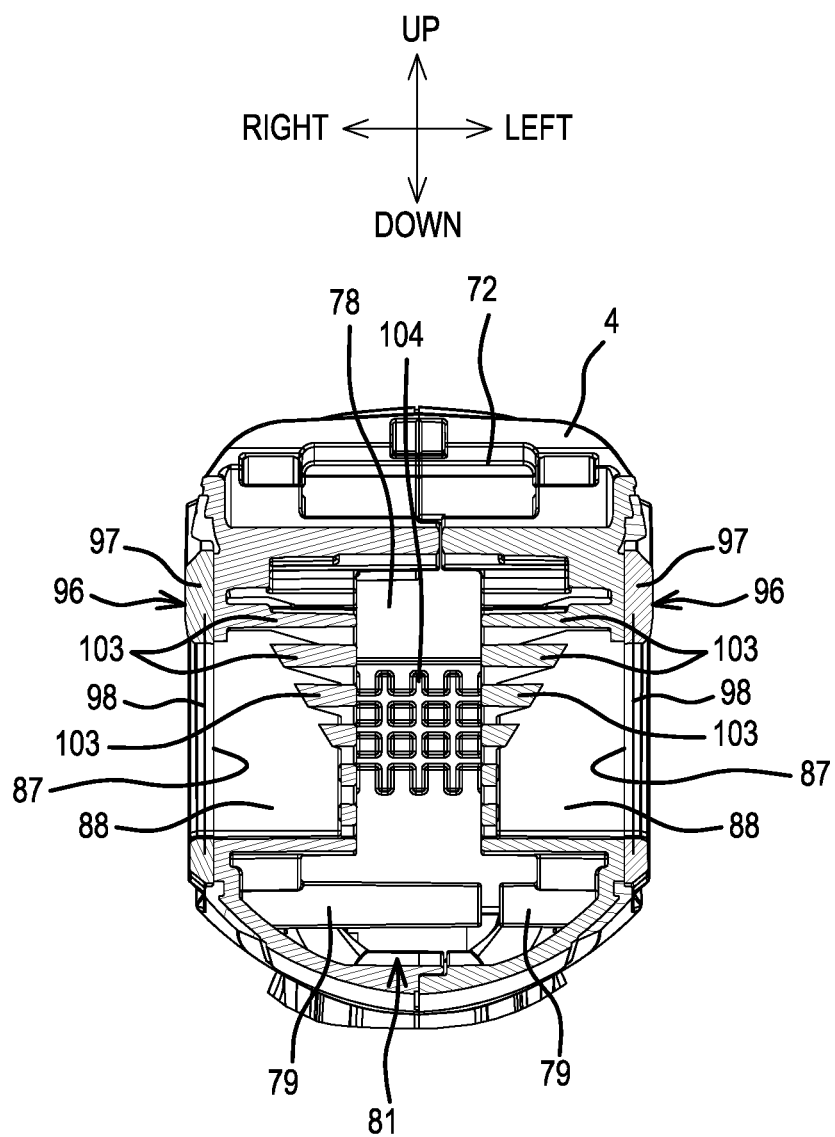
FIG. 11 is a cross-sectional view of the battery-mount part cut in a plane rearward of and parallel to guide walls.

Air-suction-port covers 96 are respectively attached to left and ride side surfaces of the battery-mount part 4 at the locations of the air-suction ports 87. As shown in FIGS. 8 and 9, a wire mesh 98 or other type of screen or filter may be provided inside a triangular rubber frame 97 whose perimeter is larger than that of the air-suction port 87. Latching pins 99 project from a rear surface of the frame 97 at each vertex part of the triangular shape and are inserted into respective latching holes 100 provided in the side surface(s) of the battery-mount part 4. Consequently, as shown in FIGS. 10 and 11, the air-suction-port covers 96 are attached such that the air-suction ports 87 are covered by the wire meshes (screens/filters) 98. At a tip part of each latching pin 99, a flange-shaped flared part 99*a* is formed, which provides a resistance in the withdrawal direction when the flared part 99*a* is inserted into the latching hole 100. The air-suction-port covers 96 make it possible to prevent the ingress of foreign matter (particulate matter) while permitting ventilation (outside air) through the air-suction ports 87.

Furthermore, in FIG. 8, reference numerals 101, 101 appearing on the side surface and the lower surface of the main-body housing 2 denote anti-slip recessed parts that are formed at prescribed spacings in the circumferential direction and are elongated in the forward-rearward direction. An elongated, anti-slip protruding part 102 is formed in the forward-rearward direction between the two anti-slip recessed parts 101, 101. The anti-slip recessed parts 101 and the protruding part 102 are formed with left-right symmetry, thereby improving the grip of the fingers that grasp the main-body housing 2.

Referring to FIGS. 2, 3, 6, 8 and 11, guide walls 88 are formed on the inner surfaces of the half housings 2*a*, 2*b* between the controller 74 and the air-suction ports 87. The guide walls 88 project in parallel from the lower surface of the case 78 of the controller 74. A gap is provided between the guide walls 88, 88 such that protruding end parts of the guide walls 88, 88 do not make contact with one another. Accordingly, outside air drawn (sucked) in through the left and right air-suction ports 87 is guided into the center of the battery-mount part 4 by the guide walls 88, 88. The outside air (airflow) descends along the lower surface of the case 78 from the gap between the guide walls 88, 88, and then flows forward. Thus, because the terminal plates 70*a*, 70*b* are disposed on the left and right with the ventilation path to the case 78 disposed in the center, the risk of short circuit of the two terminal plates 70*a*, 70*b* is reduced.

Furthermore, ribs 103 are formed in the left-right direction on a rear surface of each guide wall 88 equidistantly spaced in the up-down direction, and cause the outside air sucked in through each air-suction port 87 to be rectified (made unidirectional or straightened) and guided into the center. Referring to FIGS. 10 and 11, a lattice of grooves 104 is formed in the center of the rear surface of the case 78, and these grooves 104 make the rear surface of the case 78 into a concave-convex shape, thereby increasing the surface area of the case 78 that contacts the outside air.

As was noted above, the signal lines 21 and the power-supply lines 24 of the brushless motor 6 pass through the space 49 below the switch 46 and are wired (electrically connected) to the controller 74. Furthermore, a power-supply line 89 (FIG. 2) of the terminal block 69 passes through the space 81 below the controller 74 and is wired (electrically connected) to the controller 74. Consequently, the signal lines 21 and the power-supply lines 24 are easy to consolidate (bundle) and therefore easy to wire during assembly. Furthermore, the switch 46 has a forward-facing orientation with the button 47 disposed on the front side. Therefore a lead wire 90 connected to a rear end of the switch 46 is wired rearward, as is, over the shortest distance to the controller 74 and the terminal block 69—without passing through the space 49. Thus, because the power-supply line 89, the lead wire 90, etc. extend rearward of the switch 46, there is no need to bypass and draw the wires around the switch 46, the space 49 can be made small, and the square-tubular part 10 can be formed slimmer, which makes it easier to grip. In addition, because there is no need to bend the lead wire 90, the wiring during assembly can also be performed easily.

In the representative grinder 1 configured as above, when the square-tubular part 10 is grasped and the switch knob 60 is slid forward, the slide plate 57 advances forward as discussed above, the changing lever 51 rotates, and the switch 46 is turned ON. As a result, the brushless motor 6 will be driven by the power supply (current) from the battery pack 5. That is, the microcontroller of the controller 74 acquires the rotational state of the rotor 12 by obtaining the rotation-detection signals, which indicate the rotational positions of the permanent magnets 20 of the rotor 12 output from the rotation-detection devices of the sensor circuit board 17, and controls the ON/OFF state of each of the switching devices in accordance with the acquired rotational state. The rotor 12 is rotated by sequentially supplying electric current to the coils 16 of the stator 11. Because the rotary shaft 26 rotates and the spindle 7 is rotated via the bevel gears 37, 38, it becomes possible for the tool accessory 43 to perform grinding work, etc.

In the present embodiment, because the front stopper 33 and the rear stopper 34 are provided at the front and the rear of the rotating rotor 12, the movement of each permanent magnet 20 in the forward-rearward directions is restricted, which prevents the rotor core 27 from falling out. As a result, there is no risk that the permanent magnets 20 will drop out, and thus the brushless motor 6 can be used with high reliability.

In addition, during usage of the grinder 1, the display part 86 indicates the remaining capacity of the battery by turning on or off the LEDs 77, and the visibility of the display part 86 is suitable owing to the tilted orientation of the controller 74. Furthermore, even though the controller 74 is set at the tilted orientation in this manner, the battery pack 5 is mounted with an orientation orthogonal to the main-body housing 2, which makes it possible to set the battery pack 5 downward on a surface and stand the grinder 1 vertically (freestanding). Furthermore, the overall length of the grinder 1 also does not increase.

Moreover, when the centrifugal fan 30 rotates in accordance with the rotation of the rotary shaft 26, the outside (cooling) air is drawn (sucked) in through the rear air-suction ports 87, passes between the ribs 103, travels from the center part of the case 78 of the controller 74 guided by the guide walls 88, arrives at the space 81, travels around the controller 74 from below, and advances into the main-body housing 2. Furthermore, the (cooling) air passes through the space 49 and between the stator 11 and the rotor 12 of the brushless motor 6, travels from the main-body housing 2 and arrives in the gear housing 3, and is then externally discharged through the air-exhaust ports 39 at the forward end of the grinder 1 (see FIG. 1). As a result of this design, the controller 74 and the terminal block 69, as well as the brushless motor 6, are cooled by the flow of this (cooling) air. Particularly in the controller 74, once the outside air is guided to the center part by the guide walls 88, the air then flows along the lower surface of the case 78 to the outer circumference side, which increases the surface area of the controller 74 that contacts the air, and thereby the controller 74 is efficiently cooled.

When the switch knob 60 is slid rearward, the slide plate 57 retracts, the changing lever 51 rotates, and the switch 46 is turned OFF, which stops the drive (rotation) of the brushless motor 6.

Thus, according to the grinder 1 of the above-described representative embodiment, the controller 74 is provided on the battery-mount part 4 in the main-body housing 2 and is disposed adjacent to the terminal block 69 that is electrically connected to the battery pack 5. The air-suction ports 87 are provided between the controller 74 and the terminal block 69, which makes it possible to suitably cool the terminal block 69 in addition to the controller 74.

It is noted that the visibility of the display part 86 is satisfactory because the brushless motor 6, the controller 74, and the terminal block 69 are disposed along a straight line, the controller 74 is tilted with respect to the straight line, the display part 86 for indicating the remaining battery capacity is provided at the end part of the tilted controller 74 on the side near the terminal block 69, and the display part 86 is made visible via the (transparent) window 83 provided on the battery-mount part 4.

Furthermore, it is noted that the guide walls 88, which guide the outside air drawn (sucked) in through the air-suction ports 87 to the center of the controller 74, are provided on the inner surfaces of the main-body housing 2 between the controller 74 and the air-suction ports 87, and therefore the cooling of the controller 74 is performed more effectively.

Moreover, according to the grinder 1 of the above-described embodiment, the switch 46 is housed with a forward-facing orientation with the button 47 pointed forward, which makes it easy to wire the switch 46 during assembly and makes it possible to also reduce the diameter of the main-body housing 2.

It is also noted that the slide plate 57 that slides in the forward-rearward directions linked with the switch knob 60 is provided inside the main-body housing 2, and the pressing mechanism (changing lever 51) that presses the button 47 of the switch 46 in accordance with the advance of the slide plate 57 and separates from the button 47 in accordance with the retraction of the slide plate 57 is provided between the slide plate 57 and the switch 46. Consequently, even though the switch 46 has a forward-facing orientation, there is no longer a need to change the operation direction of the switch knob 60 (ON to advance and OFF to retract), and therefore ease of operation can be maintained.

In addition, it is noted that the pressing mechanism is rotatably supported inside the main-body housing 2. Furthermore, the arm part 55 at the upper end is engaged with the slide plate 57, and the cam part 54 on the lower end is located forward of the button 47. Moreover, the changing lever 51 has the cam part 54 that pushes the button 47 by rotating in accordance with the advance of the slide plate 57. Therefore the pressing mechanism can be formed simply.

Furthermore, in the above-described embodiment, although only the controller is tilted, the terminal block may also be tilted in a similar manner and/or the battery pack, too, may be tilted with respect to the axis line of the main-body housing. In such an embodiment, the air-suction ports may be formed parallel to one another between the controller and the terminal block such that their front-rear length is the same from top to bottom.

In addition or in the alternative, it is not necessary to provide the air-suction ports on both the left and right sides of the battery-mount part. Instead, one or more air-suction ports can instead be provided on only one side. In such an embodiment, it may be sufficient to provide the guide wall only on one side. In addition or in the alternative, the guide walls, the ribs, or the like can be omitted in further embodiments of the present teachings.

Furthermore, the switch knob may be provided on a side surface rather than on an upper surface of the main-body housing. In such an embodiment, the changing lever is preferably rotatably supported in a transversely oriented manner.

Figure 12:
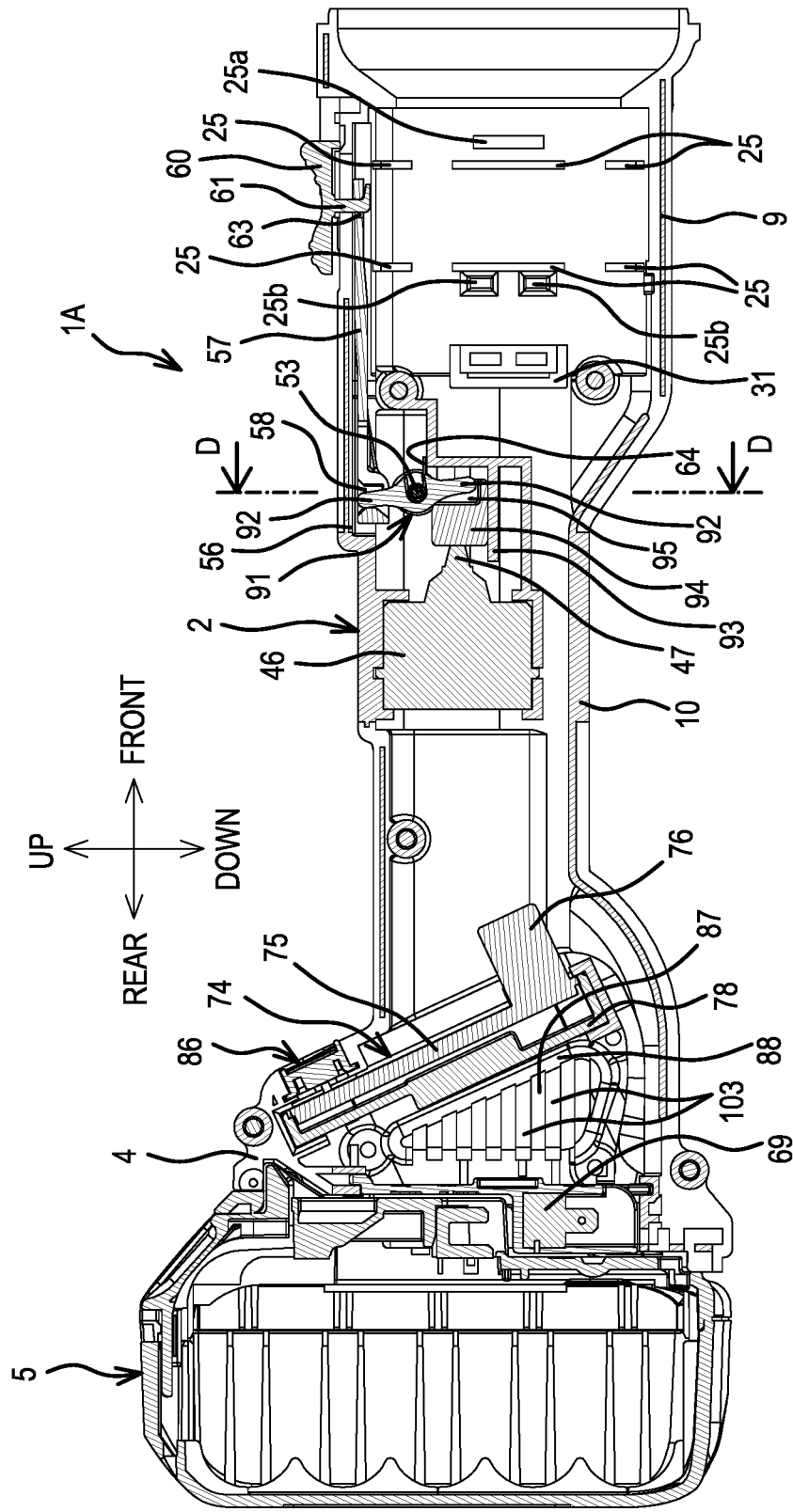
FIG. 12 is a partial longitudinal cross-sectional view of the rechargeable grinder (in the switch OFF state) according to a modified example.
Figure 13:
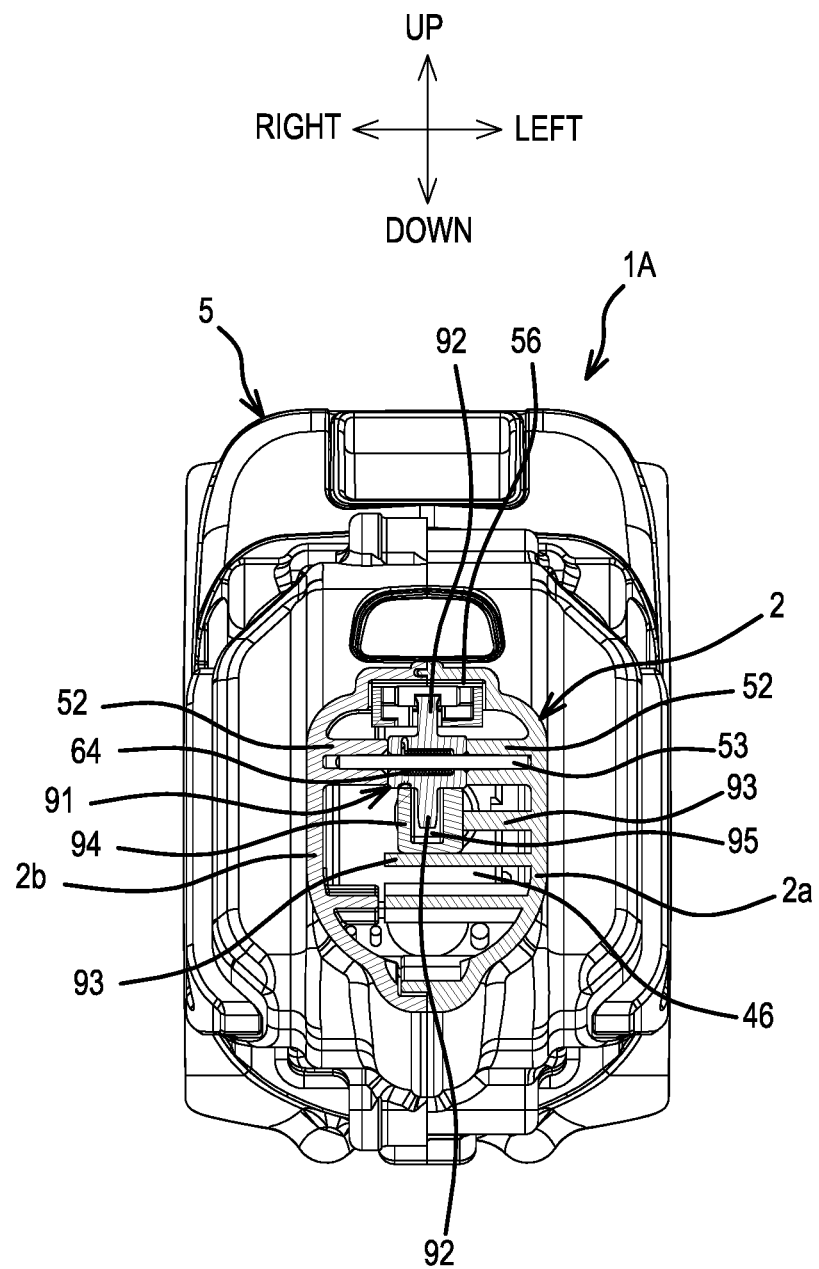
FIG. 13 is a cross-sectional view taken along line D-D in FIG. 12.

Moreover, the pressing mechanism of the switch is not limited to the changing lever of the above-mentioned embodiment and can be modified as appropriate. For example, FIGS. 12 and 13 show a grinder 1A according to a modified example, wherein the brushless motor and the gear housing sides are not shown for the sake of clarity. In a changing lever (switch lever) 91 herein, arm parts 92, 92 project above and below with point symmetry. A pushbutton 94 that serves as a button member is provided forward of the switch 46 such that it is capable of moving forward and rearward along small ribs 93 that project from the inner surfaces of the half housings 2a, 2b. The arm part 92 on the upper side of the changing lever 91 engages in the coupling hole 58 at the rear end of the slide plate 57, and the arm part 92 on the lower side engages in a latching hole 95 provided at a front end of the pushbutton 94.

Figure 14:
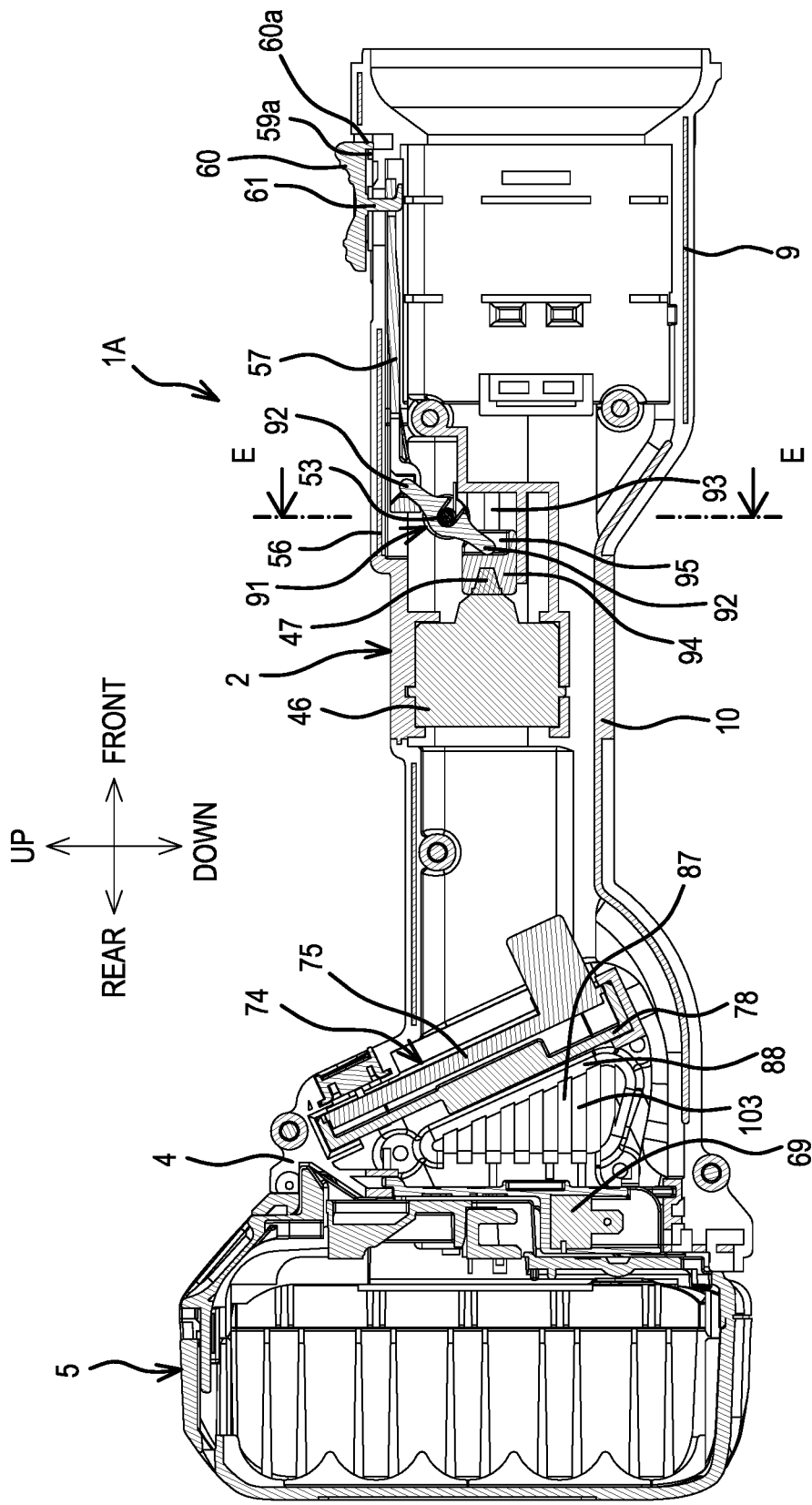
FIG. 14 is a partial longitudinal cross-sectional view of the rechargeable grinder (in the switch ON state) according to the modified example.
Figure 15:
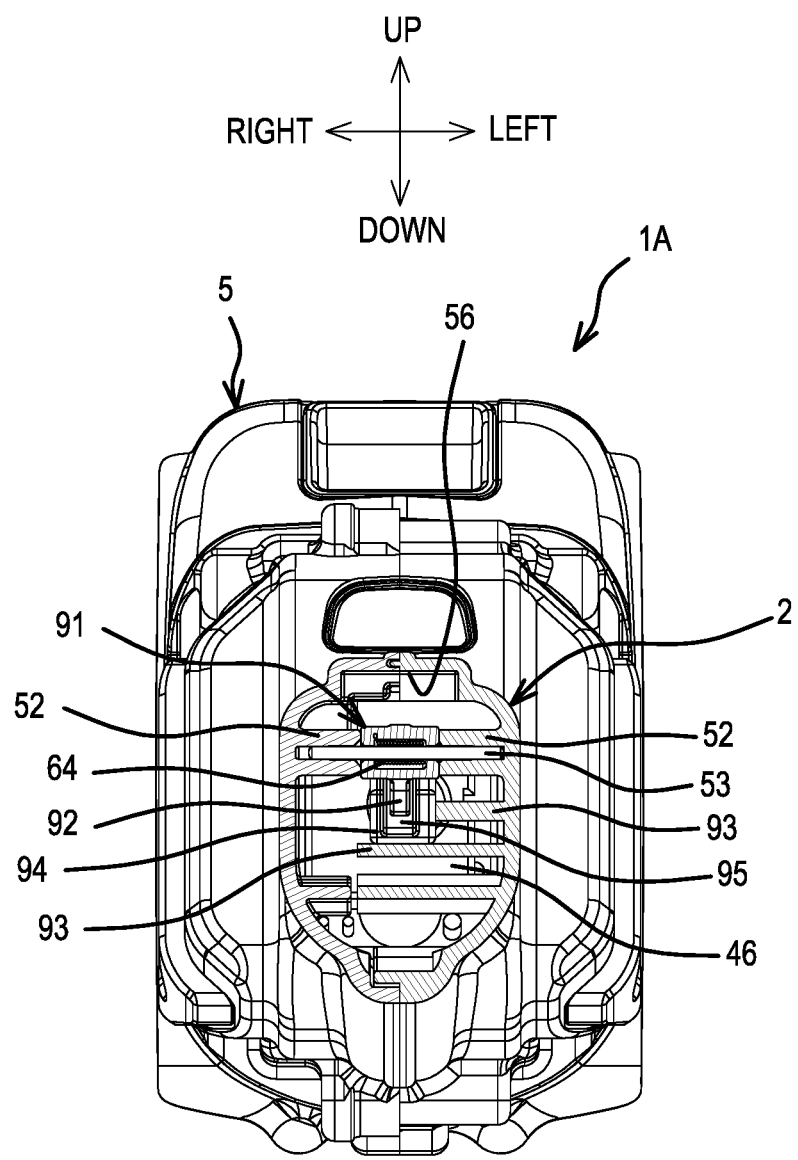
FIG. 15 is a cross-sectional view taken along line E-E in FIG. 14.

In this modified example, when the switch knob 60 is at the retracted position, the slide plate 57 is also at the retracted position, and thereby the changing lever 91 is maintained at the rotational position at which the upper and lower arm parts 92, 92 are aligned in the up-down direction. In this state, the pushbutton 94 is at a position at which it makes contact with the button 47 but does not push (apply pressure to) the button 47 (the switch 46 is OFF). Furthermore, when the switch knob 60 is advanced, the slide plate 57 also advances and the changing lever 91 rotates clockwise (as shown in FIG. 12) due to the connection of the arm part 92 on the upper side to the slide plate 57. Consequently, as shown in FIGS. 14 and 15, the arm part 92 on the lower side slides the pushbutton 94 rearward, which pushes (applies pressure to) the button 47 and thereby turns the switch 46 ON.

Thus, if the tool is designed such that the pushbutton 94, which integrally moves forward and rearward engaged with the arm part 92, is disposed between the arm part 92 of the changing lever 91 and the button 47, and the arm part 92 presses the button 47 via the pushbutton 94 in accordance with the rotation of the changing lever 91, then even if the rotatable changing lever 91 is provided, the button 47 can be pushed by the pushbutton 94 in the axial direction of the main-body housing 2.

However, it is possible to, for example, omit such a pressing mechanism and form the rear end of the slide member of the slide plate and the like in the shape of an L turned on its side, and to turn the switch ON by sliding the operating member rearward, thereby causing the slide member to directly push the button.

In addition, the present teachings concerning the cooling of the controller and the terminal block are not limited to a grinder and can also be adapted (applied) to other power tools, regardless of the orientation and the like of the switch, as long as the power tool comprises a controller and a battery (e.g., a battery pack) serves as the power supply.

Moreover, the present teachings concerning the orientation of the switch are not limited to a grinder and may be any battery-powered or AC-powered tool (i.e. not having a battery that serves as the power supply), and can be adapted (applied) to other power tools as well, such as a joint cutter (plate joiner or biscuit cutter), a nibbler, a straight shear, etc., as long as the power tool comprises a switch that turns ON and OFF by sliding an operating member.

Representative, non-limiting examples of the present invention were described above in detail with reference to the attached drawings, and additional examples are provided below. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings to provide improved power tools.

Moreover, combinations of features and steps disclosed in the above detailed description, as well as in the below additional examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional representative embodiments (examples) of the present teachings include, but are not limited to:

1. A rechargeable power tool, such as e.g., a grinder (including e.g., an angle grinder and a die grinder), a gauge nibbler, a cut-out tool, a plate joiner, a barrel-grip/body-grip jigsaw, a barrel-grip/body-grip router or orbital sander, etc., comprising:

a brushless motor comprising a stator and a rotor, the rotor comprising a rotary shaft extending in a forward-rearward direction (e.g., an axial direction) of the power tool;

a spindle configured (adapted) to be rotated by the rotary shaft and extending in an up-down direction of the power tool (which is, e.g., perpendicular to the forward-rearward direction);

a fan fixedly coupled to the rotary shaft so as to rotate therewith;

a switch disposed rearward of the brushless motor in the forward-rearward direction;

a controller disposed rearward of the switch in the forward-rearward direction and being configured (adapted) to control the operation of the brushless motor;

a battery pack disposed rearward of the controller in the forward-rearward direction; and a main-body housing that houses the brushless motor, the switch, and the controller, wherein a battery-mount part is formed (defined) at a rear end of the main-body housing in the forward-rearward direction, and the battery pack is attached (attachable) to the battery-mount part;

wherein the battery-mount part of the main-body housing also houses the controller, at least one air-suction port is defined (provided) in the battery-mount part; and the controller is disposed in the battery-mount part such that air, which is sucked in from the at least air-suction port as the fan rotates, is directed towards the controller and cools the controller.

2. The rechargeable power tool according to embodiment 1, further comprising at least one air-suction-port cover attached to the main-body housing and covering an outer side of the at least one air-suction port, the at least one air-suction-port cover comprising a wire mesh.

3. The rechargeable power tool according to embodiment 1 or 2, wherein the switch is operably coupled to a switch knob disposed on an outer circumference of the stator.

4. The rechargeable power tool according to any one of embodiments 1 to 3, further comprising a terminal block electrically connected (connectable) to the battery pack and provided rearward of the controller in the forward-rearward direction, the terminal block being disposed in the battery-mount part such that air, which is sucked in from the at least air-suction port as the fan rotates, is directed towards the terminal block and cools the terminal block.

5. The rechargeable power tool according to any one of embodiments 1 to 4, wherein the main-body housing comprises a first tubular part, which houses the brushless motor, and a second tubular part, which houses the switch, the second tubular part having a diameter that is smaller than the diameter of the first tubular part.

6. The rechargeable power tool according to embodiment 5, further comprising a switch knob operably coupled to the switch and disposed on an outer surface of the first tubular part.

7. The rechargeable power tool according to embodiment 6, further comprising a slide plate operably coupled between the switch and the switch knob, the slide plate being slidably guided in a guide part provided on an inner surface of the main-body housing and extending in the forward-rearward direction.

8. The rechargeable power tool according to any one of embodiments 5 to 7, further comprising a retaining rib configured (adapted) to holding the switch and being formed (disposed or defined) on the second tubular part, wherein a space is defined in the main-body housing downward of the retaining rib in the up-down direction, and a power-supply line or the signal line connected to the stator is wired through the space.

9. The rechargeable power tool according to any one of embodiments 1 to 8, further comprising:
a gear housing that houses the spindle and protrudes downward from a forward portion of the main-body housing; and
at least one air-exhaust port defined in the gear housing and being configured (adapted) to exhaust air sucked in from the air-suction port.

10. The rechargeable power tool according to any one of embodiments 1 to 9, further comprising:
a sensor circuit board configured (adapted) to detect the rotational position of the rotor, the sensor circuit board being fixed to a rear part of the stator via at least one screw; and
at least one signal line configured (adapted) to output a detection signal from the sensor board, the at least one signal line extending out from an upper part of the sensor circuit board.

11. The rechargeable power tool according to any one of embodiments 1 to 10, wherein the main-body housing comprises a pair of left and right half housings joined by screws; receiving plates hold a bearing that pivotably supports the rotary shaft, the receiving plates projecting from respective inner surfaces of the half housings; and signal lines are connected to the stator and are respectively wired between the screws and the receiving plates.

12. A rechargeable power tool, such as e.g., a power tool (including e.g., an angle grinder and a die grinder), a gauge nibbler, a cut-out tool, a plate joiner, barrel-grip/body-grip jigsaws, barrel-grip/body-grip routers or orbital sanders, etc., comprising:
a brushless motor comprising a stator and a rotor, the rotor comprising a rotary shaft extending in a forward-rear direction (e.g., an axial direction) of the power tool;
a spindle configured (adapted) to be rotated by the rotary shaft and extending in an up-down direction of the power tool (which is, e.g., perpendicular to the forward-rearward direction);
a fan fixedly coupled to the rotary shaft so as to rotate therewith;
a switch disposed rearward of the brushless motor in the forward-rearward direction;
a controller disposed rearward of the switch in the forward-rearward direction and being configured (adapted) to control the operation of the brushless motor;
a battery pack disposed rearward of the controller in the forward-rearward direction; and
a main-body housing that houses the brushless motor, the switch, and the controller;
wherein the main-body housing comprises a first tubular part, which houses the brushless motor, and a second tubular part, which houses the switch, the second tubular part having a diameter that is smaller than the diameter of the first tubular part.

13. The rechargeable power tool according to embodiment 12, further comprising a switch knob operably coupled to the switch and disposed on an outer surface of the first tubular part.

14. The rechargeable power tool according to embodiment 13, further comprising a slide plate operably coupled between the switch and the switch knob, the slide plate being slidably guided in a guide part provided on an inner surface of the main-body housing and extending in the forward-rearward direction.

15. The rechargeable power tool according to any one of embodiments 12 to 14, wherein the main-body housing comprises a pair of left and right half housings joined by screws; receiving plates hold a bearing that pivotably supports the rotary shaft, the receiving plates projecting from respective inner surfaces of the half housings; and signal lines connected to the stator and respectively wired between the screws and the receiving plates.

16. The rechargeable power tool according to any one of embodiments 12 to 15, further comprising a retaining rib configured (adapted) to holding the switch and being formed (disposed or defined) on the second tubular part, wherein a space is defined in the main-body housing downward of the retaining rib in the up-down direction, and a power-supply line or the signal line connected to the stator is wired through the space.

17. The rechargeable power tool according to any one of the preceding embodiments, wherein the rechargeable power tool is a grinder.

18. A rechargeable power tool, such as e.g., a power tool (including e.g., an angle grinder and a die grinder), a gauge nibbler, a cut-out tool, a plate joiner, barrel-grip/body-grip jigsaws, barrel-grip/body-grip routers or orbital sanders, etc., comprising:
a housing;
a motor and a controller configured to control a rotary output of the motor, the motor and controller being housed inside the housing;
a battery mounted on the housing and constituting a power supply for the motor and the controller; and
a fan provided on a rotary shaft of the motor, the fan being configured to draw in outside air, when the rotary shaft rotates, into an interior of the housing through at least one air-suction port defined in the housing and to cause the outside air to pass through the motor;
wherein the controller is disposed adjacent to a terminal block that is provided on a battery-mount part of the housing, the terminal block being electrically connected to the battery; and
the air-suction port is disposed between the controller and the terminal block.

19. The power tool according to embodiment 18, wherein:
an imaginary straight line intersects the motor, the controller, and the terminal block; and
the controller is tilted with respect to the straight line.

20. The power tool according to embodiment 19, further comprising:
a display configured to display a remaining battery capacity of the battery and provided at an end part of the tilted controller on a side of the tilted controller that is nearest the terminal block; and
the display is visible to a user through a window provided on the battery-mount part.

21. The power tool according to embodiment 19 or 20, wherein the battery is tilted with respect to the straight line.

22. The power tool according to any one of embodiments 18-21, further comprising:
at least one guide wall configured to guide the outside air drawn in through the at least air-suction port towards a center of the controller, the at least one guide wall being provided on an inner surface of the housing between the controller and the at least one air-suction port.

23. The power tool according to embodiment 22, further comprising:

a plurality of ribs provided on the at least one guide wall, the ribs being configured to straighten the flow of the outside air (make the airflow more laminar) drawn in through the at least one air-suction port.

24. The power tool according to any one of embodiments 18-23, wherein:

the controller comprises a circuit board housed in a case and a lattice of grooves is defined in a surface of the case that is disposed on a side closest to the at least one air-suction-port.

25. The power tool according to any one of embodiments 18-24, further comprising:

a cover disposed over the at least one air-suction port, the cover being configured to permit the outside air to pass into the air-suction port and to prevent ingress of foreign matter into the air-suction port.

26. The power tool according to any one of embodiments 18-25, further comprising:

a switch housed inside the housing; and an operating member provided on an outside surface of the housing, the operating member being configured to turn the switch ON and OFF by sliding in a forward-rearward (front-rear) direction of the power tool;

wherein a button of the switch is oriented to face forward in the forward-rearward direction.

27. The power tool according to embodiment 26, further comprising:

a slide member provided inside the housing, the slide member being linked to the operating member and configured to slide along (in) the forward-rearward (front-rear) direction; and a pressing mechanism operably disposed between the slide member and the switch, the pressing mechanism being configured to press the button in accordance with movement of the slide member forward in the forward-rearward direction and to reduce or eliminate pressure on the button in accordance with movement of the slide member rearward in the forward-rearward direction.

28. The power tool according to embodiment 27, wherein the pressing mechanism comprises a lever rotatably supported inside the housing, a first portion of the lever being operably coupled to the slide member and a second portion of the lever being located forward of the button and configured to apply pressure to the button, the lever being configured to rotate in accordance with the movements of the slide member.

29. The power tool according to embodiment 28, further comprising:

a pushbutton operably disposed between the second portion of the lever and the button, the pushbutton being configured to move forward and rearward in accordance with the rotation of the lever and to apply pressure to the button when moved rearward.

30. The rechargeable power tool according to any one of embodiments 18-29, wherein the rechargeable power tool is a grinder.

The present teachings are generally applicable to any kind of so-called "body-grip" power tools, "barrel-grip" power tools, "handle-body grip" power tools, etc., in which the tool housing or tool main body is linear (e.g., straight) or generally linear and the user grasps the tool housing or tool main body, rather than a distinct handle portion, to operate the power tool.

EXPLANATION OF THE REFERENCE NUMBERS 1, 1A Rechargeable grinder
2 Main-body housing
3 Gear housing
4 Battery-mount part
5 Battery pack
6 Brushless motor
7 Spindle
9 Circular-tubular part
10 Square-tubular part
11 Stator
12 Rotor
21 Signal line
24, 89 Power-supply lines
26 Rotary shaft
30 Centrifugal fan
39 Air-exhaust port
46 Switch
47 Button
49, 81 Spaces
51, 91 Changing lever (Pressing mechanism)
53 Pin
54 Cam part
55, 92 Arm parts
57 Slide plate
60 Switch knob (Operating member)
69 Terminal block
70a, 70b Terminal plates (Electrical contacts)
74 Controller
75 Circuit board
77 LED
78 Case
83 Window
86 Display part
87 Air-suction port
88 Guide wall
90 Lead wire
94 Pushbutton
96 Cover
103 Ribs
104 Grooves

We claim:

1. A power tool comprising:
    a tubular housing having a front-rear direction defined along a longitudinal direction of the tubular housing,
    a motor housed in the tubular housing,
    a switch disposed in the tubular housing and oriented such that a button of the switch faces forward in the front-rear direction, the button being movable in the front-rear direction,
    an operating member disposed on an exterior surface of the tubular housing and being slidable in the front-rear direction,
    a slide part slidably housed within the tubular housing, the slide part being operably coupled to the operating member so as to be slidable in the front-rear direction in conjunction with the operating member, and
    a pressing mechanism operably disposed between the slide part and the switch, the pressing mechanism being configured to turn ON the switch when the slide part is moved forward in the front-rear direction by the operating member and to turn OFF the switch when the slide part is moved rearward in the front-rear direction by the operating member.

2. The power tool according to claim 1, wherein one axial end side of the tubular housing faces forward.

3. The power tool according to claim 1, wherein:
    the pressing mechanism comprises a lever pivotably supported inside the tubular housing, a first end portion of the lever is connected to the slide part, a second end portion of the lever is disposed forward of the button, and the lever pivots in accordance with sliding movement of the slide part such that the second end of the lever depresses the button when the slide part is moved forward.

4. The power tool according to claim 3, further comprising:

a button member configured to integrally move forward and rearward in engagement with the second end portion of the lever, wherein the button member is disposed between the second end portion of the lever and the button, and the second end portion of the lever depresses the button via the button member when the lever pivots.

5. The power tool according to claim 1, further comprising:

a pin supported by a support boss that protrudes from an inner surface of the tubular housing, wherein the pressing mechanism is pivotably supported on the tubular housing via the pin.

6. The power tool according to claim 1, wherein:

the operating member is disposed in a groove defined on the exterior surface of the tubular housing and is slidable in the front-rear direction to turn the switch ON and OFF.

7. The power tool according to claim 6, wherein:

the slide part is slidably housed in a first tubular housing portion of the tubular housing, the switch is disposed in a second tubular housing portion of the tubular housing that is narrower than the first tubular housing portion, and the pressing mechanism is configured to depress the button of the switch rearward when the slide part is moved forward by the operating member and to allow the button to move frontward when the slide part is moved rearward by the operating member.

8. The power tool according to claim 7, further comprising:

a spindle configured to be rotated by the rotary shaft of the motor and extending in an up-down direction of the power tool that is at least substantially perpendicular to the front-rear direction;

wherein the switch is disposed rearward of the motor in the front-rear direction.

9. The power tool according to claim 8, wherein:

the operating member comprises a switch knob, and the slide part comprises a slide plate operably coupled between the switch and the switch knob, the slide plate being slidably guided in a guide part provided on an inner surface of the first tubular housing portion and extending in the front-rear direction.

10. The power tool according to claim 9, further comprising:

a retaining rib holding the switch and being disposed on the second tubular housing portion, wherein a space is defined in the second tubular housing portion downward of the retaining rib in the up-down direction, and a power-supply line or the signal line connected to the motor is wired through the space.

11. The power tool according to claim 10, further comprising a disk operably coupled to the spindle, wherein the power tool is a grinder.

12. The power tool according to claim 1, wherein the tubular housing comprises a first tubular housing portion disposed frontward of a second tubular housing portion that is narrower than the first tubular housing portion.

13. The power tool according to claim 1, wherein the switch includes one or more wires extending from a rear side portion of the switch.

14. A power tool comprising:

a tubular housing having a front-rear direction defined along a longitudinal direction of the tubular housing, a motor disposed in the tubular housing, a push button switch disposed in the tubular housing and oriented such that a button of the push button switch faces forward in the front-rear direction, the button being movable in the front-rear direction, a switch knob disposed on an exterior surface of the tubular housing and being slidable in the front-rear direction, a slider slidably housed within the tubular housing, the slider having a first end portion coupled to the switch knob, and a lever pivotably supported within the tubular housing, wherein a first end portion of the lever is coupled to a second end portion of the slider, and a second end portion of the lever is configured to depress the button of the push button switch rearward when the slider is moved forward in the front-rear direction by the switch knob and to allow the button to move frontward when the slider is moved rearward in the front-rear direction by the switch knob.

15. The power tool according to claim 14, further comprising one or more wires extending from a rear side portion of the push button switch.

16. The power tool according to claim 15, further comprising:

a pin supported by a support boss that protrudes from an inner surface of the tubular housing, wherein the lever is pivotably supported on the tubular housing via the pin.

17. The power tool according to claim 16, further comprising:

a spindle configured to be rotated by the rotary shaft of the motor and extending in an up-down direction of the power tool that is at least substantially perpendicular to the front-rear direction;

wherein the switch is disposed rearward of the motor in the front-rear direction.

18. The power tool according to claim 14, further comprising:

a retaining rib holding the push button switch and being disposed on the tubular housing, wherein a space is defined in the tubular housing downward of the retaining rib in the up-down direction, and a power-supply line or the signal line connected to the motor is wired through the space.

19. The power tool according to claim 14, wherein the tubular housing comprises a first tubular housing portion disposed frontward of a second tubular housing portion that is narrower than the first tubular housing portion.

* * * * *